(12) United States Patent
Lu et al.

(10) Patent No.: US 12,294,508 B2
(45) Date of Patent: May 6, 2025

(54) NETWORK NODES AND METHODS THEREIN FOR NOTIFICATION DELIVERY

(71) Applicant: Telefonaktiebolaget LM Ericsson (publ), Stockholm (SE)

(72) Inventors: Yunjie Lu, Shanghai (CN); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/019,590

(22) PCT Filed: Dec. 7, 2020

(86) PCT No.: PCT/CN2020/134268
§ 371 (c)(1),
(2) Date: Feb. 3, 2023

(87) PCT Pub. No.: WO2022/027888
PCT Pub. Date: Feb. 10, 2022

(65) Prior Publication Data
US 2023/0261953 A1    Aug. 17, 2023

(30) Foreign Application Priority Data
Aug. 7, 2020    (WO) ................ PCT/CN2020/107890

(51) Int. Cl.
*G06F 15/173*    (2006.01)
*H04L 41/40*    (2022.01)
(Continued)

(52) U.S. Cl.
CPC .......... *H04L 41/5054* (2013.01); *H04L 41/40* (2022.05); *H04L 67/56* (2022.05)

(58) Field of Classification Search
CPC ..... H04L 41/5054; H04L 41/40; H04L 67/56; H04L 67/51; H04L 67/55; H04L 67/02; H04L 41/0253; H04L 67/30
See application file for complete search history.

(56) References Cited

U.S. PATENT DOCUMENTS

2019/0081942 A1    3/2019    Suresh
2020/0007632 A1*   1/2020    Landais ................. H04L 67/02
(Continued)

FOREIGN PATENT DOCUMENTS

| WO | 2019072058 A1 | 4/2019 |
| WO | 2020099943 A1 | 5/2020 |
| WO | 2022027887 A1 | 2/2022 |

OTHER PUBLICATIONS

Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.
(Continued)

*Primary Examiner* — John B Walsh
(74) *Attorney, Agent, or Firm* — Withrow & Terranova, PLLC

(57) ABSTRACT

The present disclosure provides a method in a Network Function, NF, producer. The method includes transmitting, to a Service Communication Proxy, SCP, a notification request for delivering a notification. The notification request contains a Uniform Resource Identifier, URI, having a predetermined service path indicating that the notification request is associated with a default notification subscription.

21 Claims, 10 Drawing Sheets

(51) Int. Cl.
  *H04L 41/5054* (2022.01)
  *H04L 67/56* (2022.01)

(56) References Cited

U.S. PATENT DOCUMENTS

| | | | |
|---|---|---|---|
| 2021/0168215 | A1* | 6/2021 | Zong ..................... H04L 67/146 |
| 2021/0258406 | A1 | 8/2021 | Ali et al. |
| 2021/0297935 | A1 | 9/2021 | Belling et al. |
| 2021/0306203 | A1 | 9/2021 | Landais et al. |
| 2022/0014888 | A1* | 1/2022 | S Bykampadi ....... H04W 12/76 |
| 2022/0038545 | A1 | 2/2022 | Krishan |
| 2022/0060547 | A1 | 2/2022 | Krishan |
| 2022/0132454 | A1* | 4/2022 | Youn ..................... H04W 76/32 |
| 2022/0200847 | A1 | 6/2022 | Bartolome Rodrigo et al. |
| 2023/0035572 | A1* | 2/2023 | Belling ............... H04L 41/5058 |

OTHER PUBLICATIONS

Author Unknown, "Technical Specification Group Services and System Aspects; Procedures for the 5G System (5GS); Stage 2 (Release 16)," Technical Specification 23.502, Version 16.4.0, Mar. 2020, 3GPP Organizational Partners, 582 pages.
Author Unknown, "Technical Specification Group Core Network and Terminals; 5G System; Technical Realization of Service Based Architecture; Stage 3 (Release 16)," Technical Specification 29.500, Version 16.3.0, Mar. 2020, 3GPP Organizational Partners, 65 pages.
Author Unknown, "Technical Specification Group Core Network and Terminals; 5G System; Technical Realization of Service Based Architecture; Stage 3 (Release 16)," Technical Specification 29.500, Version 16.4.0, Jun. 2020, 3GPP Organizational Partners, 80 pages.
Author Unknown, "Technical Specification Group Core Network and Terminals; 5G System; Network Function Repository Services; Stage 3 (Release 16)," Technical Specification 29.510, Version 16.3.0, Mar. 2020, 3GPP Organizational Partners, 172 pages.
Author Unknown, "Technical Specification Group Core Network and Terminals; 5G System; Network Function Repository Services; Stage 3 (Release 16)," Technical Specification 29.510, Version 16.4.0, Jul. 2020, 3GPP Organizational Partners, 192 pages.
International Search Report and Written Opinion for International Patent Application No. PCT/CN2020/134268, mailed Apr. 9, 2021, 21 pages.
International Preliminary Report on Patentability for International Patent Application No. PCT/CN2020/134268, mailed Oct. 21, 2022, 29 pages.
International Search Report and Written Opinion for International Patent Application No. PCT/CN2020/134182, mailed Feb. 19, 2021, 15 pages.
International Preliminary Report on Patentability for International Patent Application No. PCT/CN2020/134182, mailed Sep. 6, 2022, 18 pages.
Examination Report for Indian Patent Application No. 202317002048, mailed Apr. 1, 2024, 6 pages.
Notice of Allowance for U.S. Appl. No. 18/019,833, mailed Apr. 15, 2024, 10 pages.
Huawei, "C4-203533: Complete the description of custom headers," 3GPP TSG-CT WG4 Meeting #98e, Jun. 2-12, 2020, Electronic Meeting, 4 pages.
Nokia, et al., "C4-202455: http redirection for indirect communication," 3GPP TSG-CT WG4 Meeting #97e, Apr. 15-24, 2020, Electronic Meeting, 8 pages.
Nokia, et al., "C4-204460: Determining the NF Service Producer Identity without support of binding procedures," 3GPP TSG-CT WG4 Meeting #99e, Aug. 18-28, 2020, Electronic Meeting, 4 pages.
Search Report for Japanese Patent Application No. 2023-504382, mailed Feb. 29, 2024, 22 pages.
Decision to Grant for Japanese Patent Application No. 2023-504382, mailed Mar. 4, 2024, 5 pages.
Intention to Grant for European Patent Application No. 20828959.5, mailed Dec. 8, 2023, 8 pages.
Notice of Allowance for U.S. Appl. No. 18/019,833, mailed Oct. 25, 2023, 10 pages.
Ericsson, "C4-204255: Notification for Default Subscription," 3GPP TSG-CT WG4 Meeting #99, Aug. 18-28, 2020, Electronic Meeting, 5 pages.
Ericsson, "CP-202022: Message and Information class for Default Subscription," 3GPP TSG-CT Meeting #89, Sep. 14-16, 2020, Electronic Meeting, 27 pages.
Decision to Grant for Japanese Patent Application No. 2023-507411, mailed Feb. 6, 2024, 4 pages.
Examination Report for European Patent Application No. 20829193.0, mailed Feb. 21, 2024, 6 pages.
Author Unknown, "Technical Specification Group Core Network and Terminals; 5G System; Network Function Repository Services; Stage 3 (Release 15)," Technical Specification 29.510, Version 15.7.0, Jul. 2020, 3GPP Organizational Partners, 130 pages.
Examination Report for Indian Patent Application No. 202317002290, mailed Mar. 13, 2024, 6 pages.
Non-Final Office Action for U.S. Appl. No. 18/422,622, mailed Oct. 11, 2024, 10 pages.
3GPP TSG CR WG4, "CP-192241: Presentation of Specification/Report to TSG: 3GPP TR 29.843, v2.1.0 on Study on Load and Overload Control of 5GC Service Based Interfaces," 3GPP TSG-CT Meeting #85, Sep. 16-17, 2019, Newport Beach, California, 1 page.
Oracle, "C4-194293: Usage of NF Binding as Discovery and Selection," 3GPP TSG-CT WG4 Meeting #94, Oct. 7-11, 2019, Portoroz, Slovenia, 3 pages.

* cited by examiner

Transmit, to an SCP, a notification request for delivering a notification, wherein the notification request contains a URI having a predetermined service path indicating that the notification request is associated with a default notification subscription

210

200

NETWORK NODES AND METHODS THEREIN FOR NOTIFICATION DELIVERY

This application is a 35 U.S.C. § 371 national phase filing of International Application No. PCT/CN2020/134268, filed Dec. 7, 2020, which claims the benefit of International Application No. PCT/CN2020/107890, filed Aug. 7, 2020, the disclosures of which are incorporated herein by reference in their entireties.

TECHNICAL FIELD

The present disclosure relates to communication technology, and more particularly, to network nodes and methods therein for notification delivery.

BACKGROUND

In Release 16, the $3^{rd}$ Generation Partnership Project (3GPP) has further broaden the use of Network Function (NF) Set concept to be applicable for all types of NFs in the $5^{th}$ Generation (5G) Core.

The 3GPP Technical Specification (TS) 23.501, V16.4.0, which is incorporated herein by reference in its entirety, gives a list of definitions related to NF service, NF service set, NF and NF set:

NF instance: an identifiable instance of the NF;
NF service: a functionality exposed by an NF through a service based interface and consumed by other authorized NFs;
NF service instance: an identifiable instance of the NF service;
NF service operation: an elementary unit an NF service is composed of;
NF Service Set: a group of interchangeable NF service instances of the same service type within an NF instance (the NF service instances in the same NF Service Set have access to the same context data); and
NF Set: a group of interchangeable NF instances of the same type, supporting the same services and the same Network Slice(s) (the NF instances in the same NF Set may be geographically distributed but have access to the same context data.

As specified in clause 5.21.3.1 of TS 23.501, several NF instances can be deployed within an NF Set to provide distribution, redundancy and scalability together as a set of NF instances. In this case, an NF can be replaced with an alternative NF within the same NF Set in case of failure, load balancing, or load re-balancing. This applies for both service operations and notification delivery.

In case of failure of NF (service) instance, or to perform load re-balancing, a so-called "binding indication" is used to select the alternative NF (service) instance.

As specified in clause 6.3.1.0 of TS 23.501, binding can be used to indicate suitable target NF producer instance(s) for NF service instance selection, reselection and routing of subsequent requests associated with a specific NF producer resource (context) and NF service. This allows an NF service producer (or referred to as NF producer) to indicate that an NF service consumer (or referred to as NF consumer), for a particular context, should be bound to an NF service instance, NF instance, NF service set or NF set depending on local policies and other criteria (e.g. at what point it is in the middle of a certain procedure, considering performance aspects, etc.). Binding can also be used by the NF consumer to indicate suitable NF consumer instance(s) for notification target instance reselection and routing of subsequent notification requests associated with a specific notification subscription and for providing Binding Indication for service(s) that the NF consumer produces for the same data context and the NF service producer is subsequently likely to invoke.

A Binding Indication is information included by an NF service producer to an NF service consumer in request responses or notifications to convey the scope within which selection/reselection of target NF/NF Services may be performed, or information included by the NF service consumer in requests or subscriptions to convey the scope within which selection/reselection of notification targets or the selection of other service(s) that the NF consumer produces for the same data context may be performed.

Table 6.3.1.0-1 in TS 23.501, reproduced as Table 1 below, defines the selection and reselection behaviors of NF services consumers and Service Communication Proxies (SCPs) depending on the Binding Indication provided by an NF service producer.

TABLE 1

Binding, selection and reselection

| Level of Binding Indication | The NF Consumer/Notification sender/ SCP selects | The NF Consumer/Notification sender/ SCP can reselect e.g. when selected producer is not available | Binding information for selection and re-selection |
| --- | --- | --- | --- |
| NF Service Instance | The indicated NF Service Instance | An equivalent NF Service instance: within the NF Service Set (if applicable) within the NF instance within the NF Set (if applicable) | NF Service Instance ID, NF Service Set ID, NF Instance ID, NF Set ID, Service name |
| NF Service Set | Any NF Service instance within the indicated NF Service Set | Any NF Service instance within an equivalent NF Service Set within the NF Set (if applicable) | NF Service Set ID, NF Instance ID, NF Set ID, Service name |
| NF Instance | Any equivalent NF Service instance within the NF instance. | Any equivalent NF Service instance within a different NF instance within the NF Set (if applicable) | NF Instance ID, NF Set ID, Service name |
| NF Set | Any equivalent NF Service instance within the indicated NF Set | Any equivalent NF Service instance within the NF Set | NF Set ID, Service name |

The Binding Indication can be contained in a Hyper Text Transfer Protocol (HTTP) header, 3gpp-Sbi-Binding, referring to the 3GPP TS 29.500, V16.3.0, which is incorporated herein by reference in its entirety. This header contains a comma-delimited list of Binding Indications from an HTTP server for storage and subsequent use by an HTTP client. The encoding of the header follows the Augmented Backus-Naur Form (ABNF) as defined in Internet Engineering Task Force (IETF) Request for Comments (RFC) 7230, June 2014.

3gpp-Sbi-Binding="3gpp-Sbi-Binding" ":" COWS "bl=" blvalue 1*(OWS ";" parameter))
  blvalue="nfinstance"/"nfset"/"nfserviceinstance"/"nfserviceset"
    parameter=parametername "=" token
    parametername="nfinst"/"nfset"/"nfservinst"/"nfserviceset"/"servname"/"scope"
    scope="other-service"/"callback"/"subscription-events"
  The following parameters are defined:
  bl (binding level): indicates a binding to either a NF Instance, a NF set, a NF Service Instance or a NF Service Set.
  nfinst (NF instance): indicates a NF Instance ID.
  nfset (NF set): indicates a NF Set ID.
  nfservinst (NF service instance): indicates a NF Service Instance ID.
  nfserviceset (NF service set): indicates a NF Service Set ID.
  scope: indicates the applicability of a Binding Indication in a service request. This may take one of the following values:
    "other-service": the binding information applies to other service(s) that the NF Service Consumer may later on provide as an NF Service Producer;
    "subscription-events": the binding information applies to subscription change event notifications;
    "callback": the binding information applies to notification or callback requests.
  The absence of this parameter in a Binding Indication in a service request shall be interpreted as "callback".
  Two scope parameters may be present in a Binding Indication if the binding information applies to notification/callback requests and to other services.
  servname (service name): indicates the name of a service or a custom service, i.e.:
    the name of the service that handles a notification or a callback request, when present in a Binding Indication for a subscription or a callback, i.e. with a scope parameter absent or set to "callback"; or
    the name of the other service(s) for which the binding applies, when present in a Binding Indication in a service request for the other services the NF Service Consumer can provide later on as an NF Service Producer, i.e. with the scope parameter set to "other-service". More than one servname parameter may be present to represent multiple such services. The absence of this parameter in a Binding Indication with the scope parameter set to "other-service" shall be interpreted as binding information that applies to all the services that the NF Service Consumer may provide later as an NF Service Producer.
  the definition and encoding of the blvalue and other parameters shall be as defined for the 3gpp-Sbi-Routing-Binding.

In Release 16, as part of Network Function Service Framework, "Indirect Communication" is defined in clause 7.1.1 in TS 23.501. NF services may communicate directly between NF Service consumers and NF Service Producers, or indirectly via a Service Communication Proxy (SCP). Whether an NF Service Consumer uses Direct Communication or Indirect Communication by using an SCP is based on configuration of the NF Service Consumer. In Direct Communication, the NF Service consumer performs discovery of the target NF Service producer by local configuration or via an NF Repository Function (NRF). The NF Service consumer communicates with the target NF Service producer directly. In Indirect Communication, the NF Service consumer communicates with the target NF Service producer via a SCP. The NF Service consumer may be configured to perform discovery of the target NF Service producer directly, or delegate the discovery of the target NF Service Producer to the SCP used for Indirect Communication. In the latter case, the SCP uses the parameters provided by NF Service consumer to perform discovery and/or selection of the target NF Service producer. The SCP address may be locally configured in NF Service consumer.

According to clause 6.3.1.0 of TS 23.501, the Binding Indication contains the information in Table 1. The Routing Binding Indication may be included in Request, Subscribe or Notification messages. It can be used in the case of indirect communication by the SCP to route the message. The Routing Binding Indication is a copy of the information in the Binding Indication and also contains the information in Table 1.

Clause 6.3.1.1 of TS 23.501 specifies NF discovery and selection aspects relevant with indirect communication. For indirect communication, the SCP performs the following functionalities regarding Network Function and Network Function Service discovery and selection:
  If the request includes a Routing Binding Indication, the SCP shall route the service request to the requested target as specified in Table 1. If the Routing Binding Indication does not exist, the SCP may get the NF Set ID from the NRF or local configuration (if available).
  If the request recipient had previously provided a Binding Indication, then the request sender shall include a Routing Binding Indication with the same contents in subsequent related requests.

A high level description of the different communication models that NF and NF services can use to interact which each other is given in Annex E of TS 23.501. Table E.1-1 of TS 23.501, reproduced as Table 2 below, summarizes the communication models, their usage and how they relate to the usage of an SCP.

TABLE 2

Communication models for NF/NF services interaction summary

| Communication between consumer and producer | Service discovery and request routing | Communication model |
|---|---|---|
| Direct communication | No NRF or SCP; direct routing | A |
| | Discovery using NRF services; no SCP; direct routing | B |

TABLE 2-continued

Communication models for NF/NF services interaction summary

| Communication between consumer and producer | Service discovery and request routing | Communication model |
|---|---|---|
| Indirect communication | Discovery using NRF services; selection for specific instance from the Set can be delegated to SCP. Routing via SCP | C |
| | Discovery and associated selection delegated to an SCP using discovery and selection parameters in service request; routing via SCP | D |

FIG. 1 shows the communication models for NF/NF services interaction in Table 2. The four communication models, Model A, Model B, Model C, and Model D, will be described briefly as follows:

Model A—Direct communication without NRF interaction: Neither NRF nor SCP are used. Consumers are configured with producers' "NF profiles" and directly communicate with a producer of their choice.

Model B—Direct communication with NRF interaction: Consumers do discovery by querying the NRF. Based on the discovery result, the consumer does the selection. The consumer sends the request to the selected producer.

Model C—Indirect communication without delegated discovery: Consumers do discovery by querying the NRF. Based on discovery result, the consumer does the selection of an NF Set or a specific NF instance of NF instance set. The consumer sends the request to the SCP containing the address of the selected service producer pointing to an NF service instance or a set of NF service instances. In the latter case, the SCP selects an NF Service instance. If possible, the SCP interacts with NRF to get selection parameters such as location, capacity, etc. The SCP routes the request to the selected NF service producer instance.

Model D—Indirect communication with delegated discovery: Consumers do not do any discovery or selection. The consumer adds any necessary discovery and selection parameters required to find a suitable producer to the service request. The SCP uses the request address and the discovery and selection parameters in the request message to route the request to a suitable producer instance. The SCP can perform discovery with an NRF and obtain a discovery result.

It is to be noted that the communication models shown in FIG. 1 apply to service request scenarios where a consumer acts as an HTTP client and a producer acts as an HTTP server. However, in notification scenarios (e.g., where each service request or response in FIG. 1 is replaced with a notification request or response), a producer acts as an HTTP client and a consumer acts as an HTTP server. In this case, "Consumer" and "Producer" in FIG. 1 are interchanged with each other.

The 3GPP TS 29.510, V16.3.0, which is incorporated herein by reference in its entirety, specifies default notification subscriptions which allow NF/NF services to register default notification subscriptions for certain notification types as NF service consumer. In the scenario of default notification subscription, an NF service consumer does not explicitly subscribe to the notification with an NF service producer, i.e., the NF service consumer does not send an explicit subscription request to the NF service producer. An NF service producer may a deliver notification associated with a default notification subscription in:

Option A: to a specific NF instance (e.g., an Access and Mobility Management Function (AMF) may send an N1 Location Service (LCS) related message to an Location Management Function (LMF) instance that has previously sent an N1 LCS related message to a User Equipment (UE), or send an N2 Public Warning System (PWS) related message to a Cell Broadcast Center Function (CBCF)/PWS Interworking Function (PWS-IWF)); or Option B: to an NF candidate discovered by other discovery factors.

The NF service producer can retrieve an NF profile of a target NF service consumer and acquire a callback Uniform Resource Identifier (URI) in a default notification subscription from the NF profile to deliver the notification. Table 6.1.6.2.2-1 of TS 29.510, reproduced as Table 3 below, gives a definition of an NF profile. Table 6.1.6.2.4-1 of TS 29.510, reproduced as Table 4 below, gives a definition of a default notification subscription. Table 6.1.6.3.4-1 of TS 29.510, reproduced as Table 5 below, defines values of NotificationType in Table 4.

TABLE 3

Definition of type NFProfile

| Attribute name | Data type | P | Cardinality | Description |
|---|---|---|---|---|
| ... | | | | |
| defaultNotificationSubscriptions | array(DefaultNotificationSubscription) | O | 1 ... N | Notification endpoints for different notification types. |

TABLE 4

Definition of type DefaultNotificationSubscription

| Attribute name | Data type | P | Cardinality | Description |
| --- | --- | --- | --- | --- |
| notificationType | NotificationType | M | 1 | Type of notification for which the corresponding callback URI is provided. |
| callbackUri | Uri | M | 1 | This attribute contains a default notification endpoint to be used by an NF Service Producer towards an NF Service Consumer that has not registered explicitly a callback URI in the NF Service Producer (e.g. as a result of an implicit subscription). |
| n1MessageClass | N1MessageClass | C | 0 ... 1 | If the notification type is N1_MESSAGES, this IE shall be present and shall identify the class of N1 messages to be notified. |
| n2InformationClass | N2InformationClass | C | 0 ... 1 | If the notification type is N2_INFORMATION, this IE shall be present and shall identify the class of N2 information to be notified. |
| versions | array(string) | O | 1 ... N | API versions (e.g. "v1") supported for the default notification type. |

TABLE 5

Enumeration NotificationType

| Enumeration value | Description |
| --- | --- |
| "N1_MESSAGES" | Notification of N1 messages |
| "N2_INFORMATION" | Notification of N2 information |
| "LOCATION_NOTIFICATION" | Notification of Location Information by AMF towards NF Service Consumers (e.g. GMLC) |
| "DATA_REMOVAL_NOTIFICATION" | Notification of Data Removal by UDR (e.g., removal of UE registration data upon subscription withdrawal) |
| "DATA_CHANGE_NOTIFICATION" | Notification of Data Changes by UDR |
| "LOCATION_UPDATE_NOTIFICATION" | Notification of UE Location Information Update by GMLC towards NF Service Consumers (e.g. NEF), during MO_LR procedure. |

Clause 6.10.3 of TS 29.500 specifies NF discovery and selection for indirect communication with delegated discovery. In particular, according to clause 6.10.3.2 of TS 29.500, when the NF service consumer is configured to use delegated service discovery, it shall include in the HTTP/2 request message the necessary NF service discovery factors to be used by the SCP to perform NF service discovery procedures on behalf of the NF service consumer. The latter shall convey these NF service discovery factors using the"3gpp-Sbi-Discovery-*" request headers. When receiving from the NF service consumer a service request containing "3gpp-Sbi-Discovery-*" request headers, and the SCP is to invoke NF service discovery towards the NRF to fulfil this task, then it shall take into account all the NF service discovery factors contained in the "3gpp-Sbi-Discovery-*" request headers. It is also possible for the SCP to be internally configured to fulfil these service discovery tasks without interacting with the NRF. If the service request contains "3gpp-Sbi-Discovery-*" request header(s) that are not supported by the SCP, the latter should include the corresponding query parameters in the discovery request to the NRF. Based on operator policy, the SCP may alternatively reject the request and return a response with the status code "400 Bad Request" to the NF service consumer with an "INVALID_DISCOVERY_PARAM" error.

According to clause 6.10.3.3 of TS 29.500, an NF may register default notification subscriptions in its NF profile or NF services in the NRF for notifications the NF is prepared to consume, including for each type of notification the corresponding notification endpoint (i.e. callback URI). This can be used e.g. by an AMF to discover the notification endpoint of other AMFs to forward N1 or N2 messages, or by an AMF to notify location information to a Gateway Mobile Location Center (GMLC), or by a User Data Repository (UDR) to notify data change or removal to a User Data Management (UDM) function. The following procedures may be used to support notifications corresponding to default notification subscriptions:

- an NF producer may perform a discovery request towards the NRF (possibly through an SCP) to discover default notification subscriptions of an NF consumer, and if so, send notifications to the corresponding notification endpoints, using routing mechanisms specified in clause 6.1 of TS 29.500; or
- an NF producer may be configured with the types of notifications corresponding to default notification subscriptions it needs to generate, and send such notifications using delegated discovery, i.e., with an SCP discovering and selecting an NF service consumer with a corresponding default notification subscription. To enable the latter, the NF producer shall include in the notification request:
  - the 3gpp-Sbi-Callback header including the name of the notify or callback service operation and the API major version if higher than 1;
  - the 3gpp-Sbi-Discovery-notification-type header set to the type of notification being set;
  - the 3gpp-Sbi-Discovery-target-nf-type header indicating the type of the consumer NF;
  - optionally, additional NF service discovery factors header to be used by the SCP to discover and select the consumer NF.

SUMMARY

For a default notification subscription in the above Model D, an NF producer as an HTTP client may send an initial request to an SCP in a form like:

<HTTPMETHOD>http(s)://{authority of SCP}/<service-path>3gpp-sbi-discovery-*

Here, for a service request operation, the <service-path> in the request URI http(s)://{authority of SCP}/<service-path> is specified explicitly in 3GPP standard specifications per API: e.g., /<apiName>/{apiVersion}/<apiSpecificResourceUriPart>. For example, if an AMF needs to create a Session Management (SM) Context in an SMF, the request may be like:

POST http(s)://{authority of SCP}/nsmf-pdusession/v1/sm-contexts
3gpp-sbi-discovery-dnn: {dnn name}
3gpp-sbi-discovery-slice: {slice}
. . . .

When the SCP receives such request, it will perform an NF discovery with discovery factors carried in the request, select an NF instance and replace the authority part of the URI with an Application Programming Interface (API) root (or apiRoot) of the selected NF instance, and then relay the request to the selected NF instance.

However, for a default notification subscription, a notification is to be sent to a callback URI and no standard form of a callback URI is specified. That is, the <service-path> of the callback URI of a default subscription is totally implementation specific and can only be discovered from the NF profile of the NF producer explicitly. With delegated discovery (Model-D), the NF producer cannot identify the <service-path> for callback URI when sending the request to the SCP, since the <service-path> for default subscriptions could be totally different for different NF instances. Thus, the NF producer cannot form a request URI for a notification to a default notification subscription with delegated discovery in the SCP.

Further, in order to deliver a notification to a default notification subscription with delegated discovery in an SCP, the SCP needs to locate an exact default notification subscription in an NF profile of a target NF consumer for acquiring a callback URI to relay the notification. This may require a notification type, and an N1 message class and an N2 information class as well. For example, a CBCF may register two default subscriptions for N2 information notification type, one for class "PWS-BACL (N2 Broadcast Completed Area List or the Broadcast Cancelled Area List)" and another for "PWS-RF (N2 Restart Indication or Failure Indication)", or an LMF register two default subscriptions for N1 message notification type, one for class "Long Term Evolution (LTE) Positioning Protocol (LPP)" and another for class "LCS".

Moreover, when an NF producer (or an SCP in case of indirect communication) delivers a notification to a default notification subscription but detects that a target NF consumer is not available (e.g., due to failure, overloading, etc.), the NF producer (or SCP) needs to reselect another NF consumer as the target of the notification, especially when the notification is targeted to a specific NF consumer (e.g., in case of the above Option A). For the default notification subscription, there may be a binding level (e.g., NF Instance/NF Set/NF Service/NF Service Set) associated with the NF consumer. However, as the NF consumer does not explicitly subscribe to the notification in this case, the NF producer, being unaware of the binding level, cannot perform the reselection of the target NF consumer properly.

It is an object of the present disclosure to provide network nodes and methods therein for notification delivery, capable of solving or mitigating at least one of the above problems.

According to a first aspect of the present disclosure, a method in an NF producer is provided. The method includes: transmitting, to an SCP, a notification request for delivering a notification. The notification request contains a URI having a predetermined service path indicating that the notification request is associated with a default notification subscription.

In an embodiment, the notification request may further contain one or more parameters required for the SCP to select a target NF consumer of the notification.

In an embodiment, the one or more parameters may include at least one of an N1 message class and an N2 information class for the notification.

According to a second aspect of the present disclosure, a method in a network node implementing an SCP function is provided. The method includes: receiving, from an NF producer, a notification request for delivering a notification, the notification request containing a URI having a predetermined service path indicating that the notification request is associated with a default notification subscription; selecting a target NF consumer of the notification based on the notification request; acquiring a callback URI associated with the default notification subscription for the target NF consumer; and transmitting the notification to the target NF consumer using the callback URI.

In an embodiment, the notification request may further contain one or more parameters required for the SCP to select the target NF consumer.

In an embodiment, the one or more parameters may include at least one of an N1 message class and an N2 information class for the notification.

In an embodiment, the operation of selecting may include performing a discovery towards an NRF based on the one or more parameters, and the operation of acquiring may include acquiring the callback URI from an NF profile returned by the NRF.

According to a third aspect of the present disclosure, a method in an NF producer is provided. The method includes: transmitting, to an SCP, a notification request for delivering a notification to a default notification subscription. The notification request indicates at least one of an N1 message class and an N2 information class for the notification.

In an embodiment, the N1 message class or the N2 information class may be carried in a header from which a query parameter for NF discovery is derivable.

According to a fourth aspect of the present disclosure, a method in a network node implementing an SCP function is provided. The method includes: receiving, from an NF producer, a notification request for delivering a notification to a default notification subscription, the notification request indicating at least one of an N1 message class and an N2 information class for the notification; selecting or reselecting a target NF consumer of the notification based on the notification request; transmitting the notification to the target NF consumer.

In an embodiment, the N1 message class or the N2 information class may be carried in a header from which a query parameter for NF discovery is derivable.

In an embodiment, the operation of selecting or reselecting may include performing a discovery towards an NRF based on the N1 message class and/or the N2 information class.

According to a fifth aspect of the present disclosure, a method in an NF consumer is provided. The method includes: transmitting, to an NRF, an NF register request, the NF register request containing a binding indication associated with the NF consumer for a default notification subscription; or transmitting, to an NF producer, a binding indication associated with the NF consumer for a default notification subscription in a service request that triggers delivering of a notification to the default notification subscription.

In an embodiment, the binding indication may indicate a binding level set to an NF service instance, an NF service set, an NF instance, or an NF set; and/or the binding indication may be carried in a 3gpp-sbi-binding header or a 3gpp-sbi-routing-binding header.

According to a sixth aspect of the present disclosure, a method in an NF producer is provided. The method includes: acquiring a binding indication associated with an NF consumer for a default notification subscription; and transmitting, to an SCP, a notification request for delivering a notification to the default notification subscription. The notification request contains the binding indication.

In an embodiment, the operation of acquiring may include: acquiring the binding indication from an NRF in an NF discovery process; or acquiring the binding indication from the NF consumer in a service request that triggers the delivering of the notification to the default notification subscription.

In an embodiment, the binding indication may include one or more of: a notification type, an N1 message class, an N2 information class, or a scope associated with the default notification subscription.

In an embodiment, the notification request may further indicate one or more of: a notification type, an N1 message class, an N2 information class, or a scope associated with the default notification subscription.

In an embodiment, at least one of the notification type, the N1 message class, the N2 information class, or the scope may be carried in a header from which a query parameter for NF discovery is derivable.

In an embodiment, the binding indication may indicate a binding level set to an NF service instance, an NF service set, an NF instance, or an NF set; and/or the binding indication may be carried in a 3gpp-sbi-binding header or a 3gpp-sbi-routing-binding header.

According to a seventh aspect of the present disclosure, a method in a network node implementing an SCP function is provided. The method includes: receiving, from an NF producer, a notification request for delivering a notification to a default notification subscription; acquiring a binding indication associated with an NF consumer for the default notification subscription; and reselecting another NF consumer for delivering the notification to the default notification subscription based on the binding indication.

In an embodiment, the operation of acquiring may include: acquiring the binding indication from an NRF, in an NF discovery process, or extracting the binding indication from the notification request received from the NF producer.

In an embodiment, the binding indication may include one or more of: a notification type, an N1 message class, an N2 information class, or a scope associated with the default notification subscription.

In an embodiment, the notification request may further indicate one or more of: a notification type, an N1 message class, an N2 information class, or a scope associated with the default notification subscription.

In an embodiment, at least one of the notification type, the N1 message class, the N2 information class, or the scope may be carried in a header from which a query parameter for NF discovery is derivable.

In an embodiment, the operation of reselecting may be in response to a failure, load balancing, or load rebalancing associated with the NF consumer.

In an embodiment, the binding indication may indicate a binding level set to an NF service instance, an NF service set, an NF instance, or an NF set; and/or the binding indication may be carried in a 3gpp-sbi-binding header or a 3gpp-sbi-routing-binding header.

According to an eighth aspect of the present disclosure, a network node is provided. The network node includes a communication interface, a processor and a memory. The memory stores instructions executable by the processor whereby the network node is operative to, when implementing an NF producer, perform the method according to any of the above first, third, or sixth; or when implementing a Service Communication Proxy, SCP, function, perform the method according to any of the above second, fourth, or seventh aspect; or when implementing a Network Function, NF, consumer, perform the method according to the above fifth aspect.

According to a ninth aspect of the present disclosure, a computer-readable storage medium is provided. The computer-readable storage medium has computer-readable instructions stored thereon. The computer-readable instructions, when executed by a processor of a network node, configure the network node to, when implementing an NF producer, perform the method according to any of the above first, third, or sixth; or when implementing a Service Communication Proxy, SCP, function, perform the method according to any of the above second, fourth, or seventh aspect; or when implementing a Network Function, NF, consumer, perform the method according to the above fifth aspect.

With some of the embodiments of the present disclosure, an NF producer can include, in a notification request, a URI having a predetermined service path indicating that the notification request is associated with a default notification subscription. Upon receiving the notification request, an SCP can select a target NF consumer, acquire a callback URI associated with the default notification subscription for the target NF consumer, and transmit the notification to the target NF consumer using the callback URI. In this way, the introduction of the predetermined service path allows the SCP to handle the callback URI associated with the default notification subscription properly.

With some of the embodiments of the present disclosure, an NF producer can include, in a notification request for delivering a notification to a default notification subscription, at least one of an N1 message class and an N2 information class for the notification. An SCP receiving the notification request can select or reselect a target NF consumer of the notification based at least on the N1 message class and/or the N2 information class. In this way, the selection or reselection of the target NF consumer can be made more efficient or proper.

With some of the embodiments of the present disclosure, an NF consumer can register, with an NRF, a binding indication associated with the NF consumer for a default notification subscription, or can transmit the binding indication to an NF producer in a service request that triggers delivering of a notification to the default notification subscription. In either case, the NF producer or an SCP is enabled to acquire the binding indication for use in selecting or reselecting a target NF consumer, which can make the selection or reselection more efficient or proper.

BRIEF DESCRIPTION OF THE DRAWINGS

The above and other objects, features and advantages will be more apparent from the following description of embodiments with reference to the figures, in which.

DETAILED DESCRIPTION

In the present disclosure, a network function, or NF, can be implemented either as a network element on a dedicated hardware, as a software instance running on a dedicated hardware, or as a virtualized function instantiated on an appropriate platform, e.g. on a cloud infrastructure.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figures 1, 2:
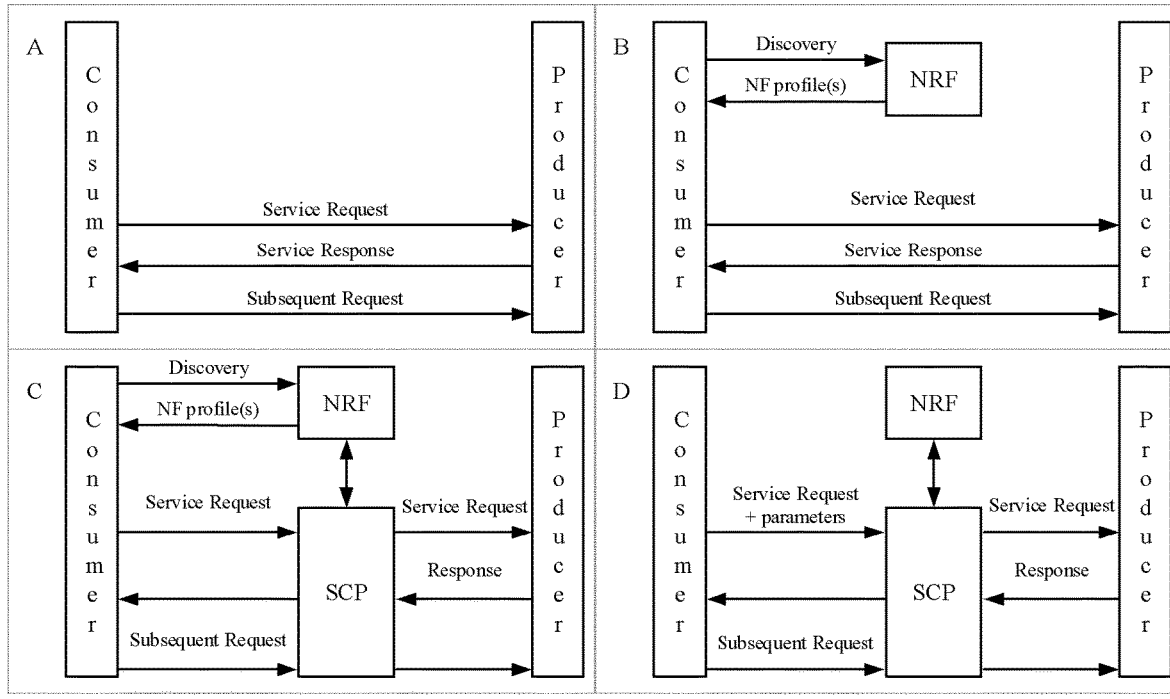
FIG. 1 is a schematic diagram showing communication models for NF/NF services interaction.
FIG. 2 is a flowchart illustrating a method in an NF producer according to an embodiment of the present disclosure.

FIG. 2 is a flowchart illustrating a method 200 according to an embodiment of the present disclosure. The method 200 can be performed at an NF producer or a network node implementing an NF producer. The method 200 can be primarily applied to e.g., the Model D as described above and those skilled in the art may understand that the method 200 could be also applied for other Models when applicable.

At block 210, a notification request for delivering a notification is transmitted to an SCP. The notification request contains a URI having a predetermined service path indicating that the notification request is associated with a default notification subscription.

In an example, the notification request may further contain one or more parameters required for the SCP to select a target NF consumer of the notification. For example, the one or more parameters may include at least one of an N1 message class and an N2 information class for the notification.

The notification request may be e.g.:
POST http(s)://{authority of SCP}/default-subscription
3gpp-sbi-discovery-notification-type: N1_MESSAGE
3gpp-sbi-discovery-n1-msg-class: LPP In this example, the URI contains a service path "/default-subscription", indicating that the notification request is associated with a default notification subscription. The notification request also contains a notification type "N1_MESSAGE" and an N1 message class "LPP", which can be used by the SCP for selecting a target NF consumer and/or a default notification subscription.

Figure 3:
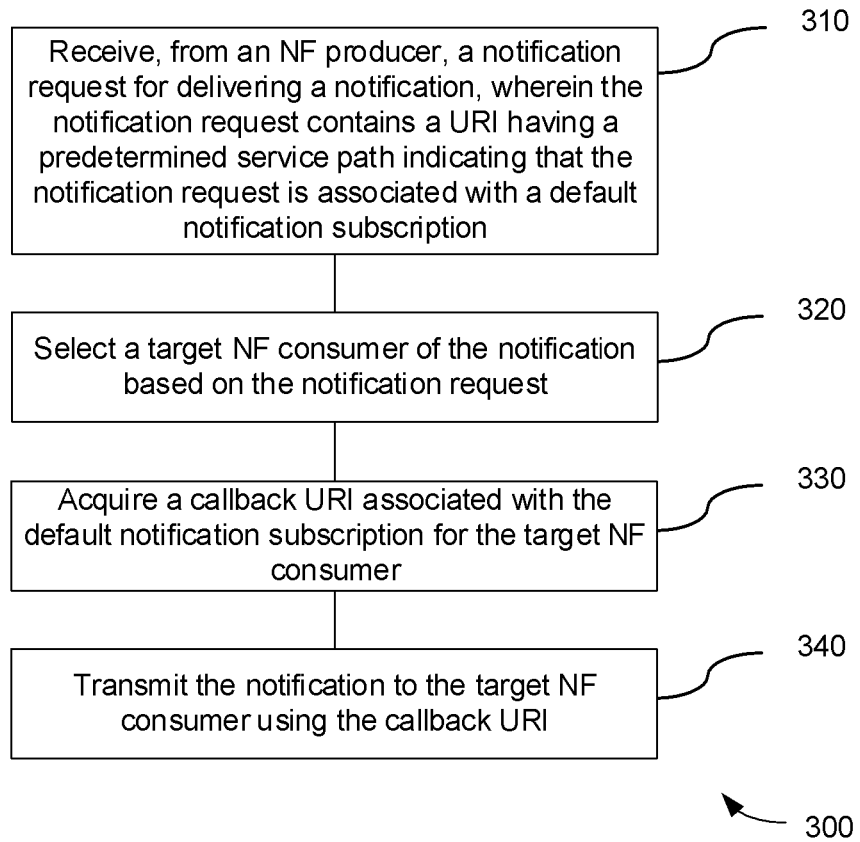
FIG. 3 is a flowchart illustrating a method in an SCP according to an embodiment of the present disclosure.

FIG. 3 is a flowchart illustrating a method 300 according to an embodiment of the present disclosure. The method 300 can be performed at an SCP or a network node implementing an SCP function. The method 300 can be primarily applied to e.g., the Model D as described above and those skilled in the art may understand that the method 300 could be also applied for other Models when applicable.

At block 310, a notification request for delivering a notification is received from an NF producer. The notification request contains a URI having a predetermined service path indicating that the notification request is associated with a default notification subscription. The predetermined service path can be e.g., "/default-subscription", as described above in connection with FIG. 2.

In an example, the notification request may further contain one or more parameters required for the SCP to select a target NF consumer of the notification. For example, the one or more parameters may include at least one of an N1 message class and an N2 information class for the notification.

At block 320, a target NF consumer of the notification is selected based on the notification request.

In an example, in the block 320, the target NF consumer can be selected by performing a discovery towards an NRF based on the one or more parameters. In particular, the SCP may perform an NF discovery towards the NRF using the parameters (e.g., notification type, N1 message class, N2 information class, etc.), retrieve, from the NRF, NF profiles of target NF consumer candidates matching the parameters, and select the target NF consumer from the candidates.

At block 330, a callback URI associated with the default notification subscription is acquired for the target NF consumer.

In an example, in the block 330, the callback URI can be from the NF profile retrieved from the NRF.

At block 340, the notification is transmitted to the target NF consumer using the callback URI. For example, the SCP can replace the entire URI in the notification request with the callback URI when forwarding the notification request to the target NF consumer.

Figure 4:
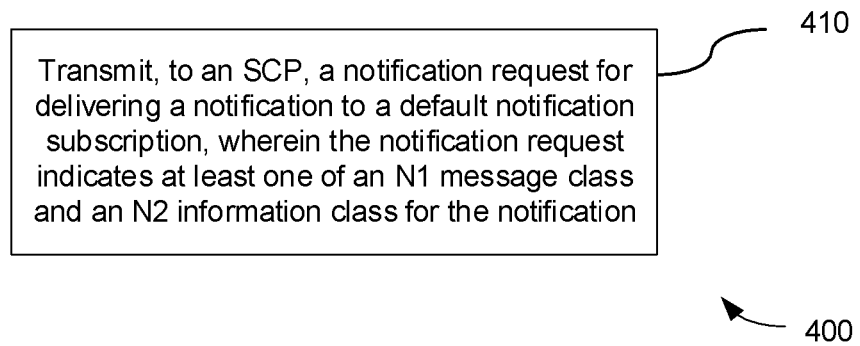
FIG. 4 is a flowchart illustrating a method in an NF producer according to another embodiment of the present disclosure.

FIG. 4 is a flowchart illustrating a method 400 according to an embodiment of the present disclosure. The method 400 can be performed at an NF producer or a network node implementing an NF producer.

At block 410, a notification request for delivering a notification to a default notification subscription is transmitted to an SCP. The notification request indicates at least one of an N1 message class and an N2 information class for the notification.

In an example, the N1 message class or the N2 information class may be carried in a header from which a query parameter for NF discovery is derivable. For example, the header can be "3gpp-sbi-discovery-n1-msg-class" or "3gpp-sbi-discovery-n2-info-class".

Figure 5:
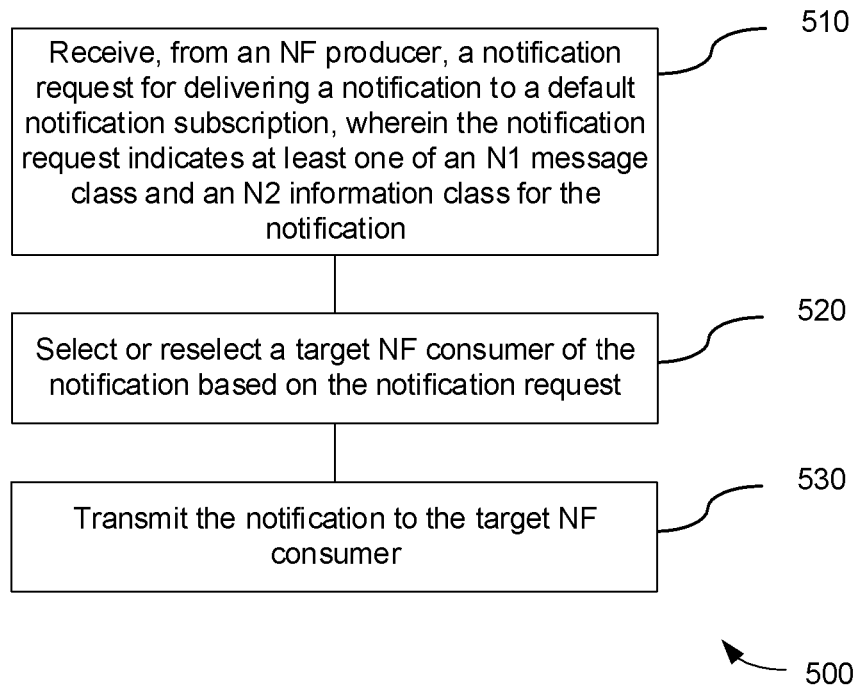
FIG. 5 is a flowchart illustrating a method in an SCP according to another embodiment of the present disclosure.

FIG. 5 is a flowchart illustrating a method 500 according to an embodiment of the present disclosure. The method 500 can be performed at an SCP or a network node implementing an SCP function.

At block 510, a notification request for delivering a notification to a default notification subscription is received from an NF producer. The notification request indicates at least one of an N1 message class and an N2 information class for the notification.

In an example, the N1 message class or the N2 information class may be carried in a header from which a query parameter for NF discovery is derivable. For example, the header can be "3gpp-sbi-discovery-n1-msg-class" or "3gpp-sbi-discovery-n2-info-class".

At block 520, a target NF consumer of the notification is selected, or reselected (e.g., due to failure or overloading of a previously selected target NF consumer), based on the notification request.

In an example, in the block 520, the target NF consumer can be selected or reselected by performing a discovery towards an NRF based on the N1 message class and/or the N2 information class. In particular, the SCP may perform an NF discovery towards the NRF using parameters such as notification type, N1 message class, N2 information class, etc., retrieve, from the NRF, NF profiles of target NF consumer candidates matching the parameters, and select the target NF consumer from the candidates.

Figure 6:
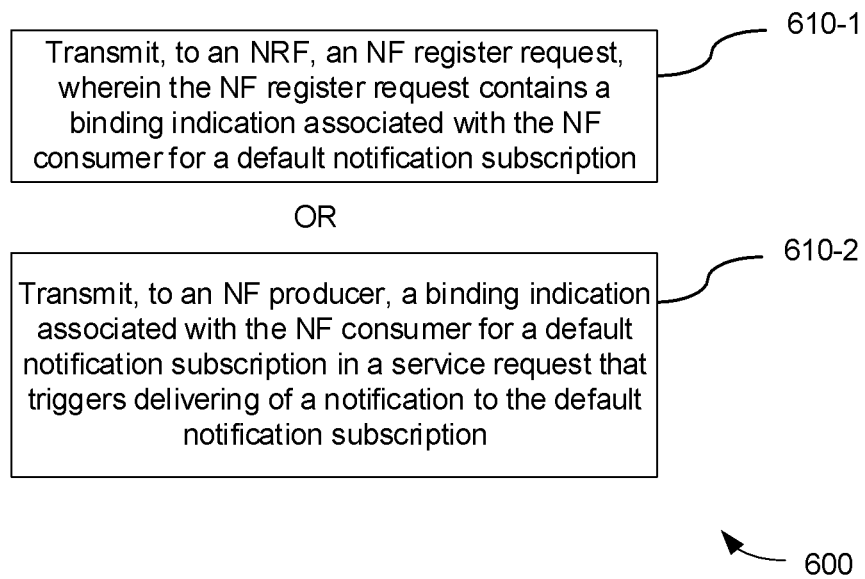
FIG. 6 is a flowchart illustrating a method in an NF consumer according to yet another embodiment of the present disclosure.

FIG. 6 is a flowchart illustrating a method 600 according to an embodiment of the present disclosure. The method 600 can be performed at an NF consumer or a network node implementing an NF consumer.

At block 610-1, an NF register request is transmitted to an NRF. The NF register request contains a binding indication associated with the NF consumer for a default notification subscription.

Alternatively, at block 610-2, a binding indication associated with the NF consumer for a default notification subscription is transmitted to an NF producer in a service request that triggers delivering of a notification to the default notification subscription.

In an example, the binding indication may indicate a binding level set to an NF service instance, an NF service set, an NF instance, or an NF set. The binding indication may be carried in a 3gpp-sbi-binding header or a 3gpp-sbi-routing-binding header.

Figure 7:
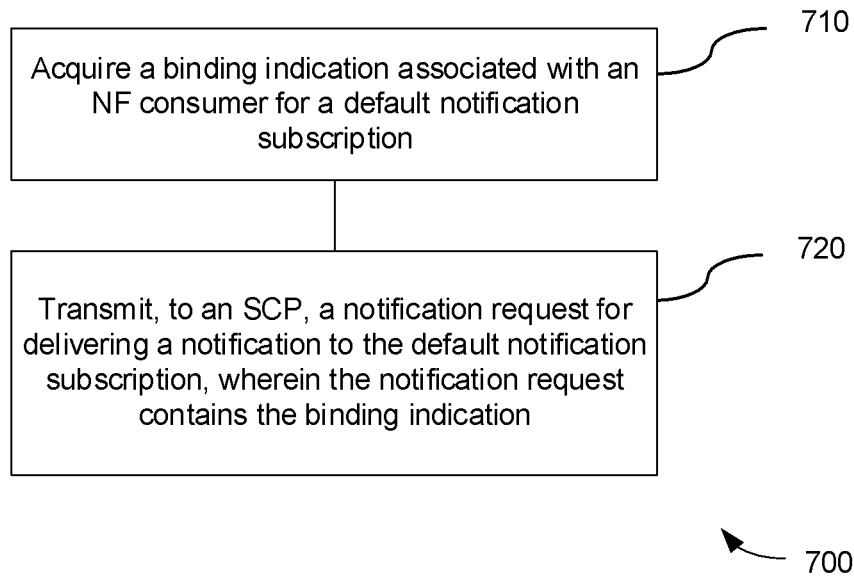
FIG. 7 is a flowchart illustrating a method in an NF producer according to yet another embodiment of the present disclosure.

FIG. 7 is a flowchart illustrating a method 700 according to an embodiment of the present disclosure. The method 700 can be performed at an NF producer or a network node implementing an NF producer.

At block 710, a binding indication associated with an NF consumer for a default notification subscription is acquired.

In an example, the binding indication may indicate a binding level set to an NF service instance, an NF service set, an NF instance, or an NF set.

In an example, in the block 710, the binding indication may be acquired from an NRF in an NF discovery process, or from the NF consumer in a service request that triggers the delivering of the notification to the default notification subscription.

At block 720, a notification request for delivering a notification to the default notification subscription is transmitted to an SCP. The notification request contains the binding indication. The binding indication may be carried in a 3gpp-sbi-binding header or a 3gpp-sbi-routing-binding header.

In an example, the binding indication may include one or more of: a notification type, an N1 message class, an N2 information class, or a scope associated with the default notification subscription. Alternatively, the notification request may further indicate one or more of the notification type, the N1 message class, the N2 information class, or the scope. Here, at least one of the notification type, the N1 message class, the N2 information class, or the scope may be carried in a header from which a query parameter for NF discovery is derivable.

Figure 8:
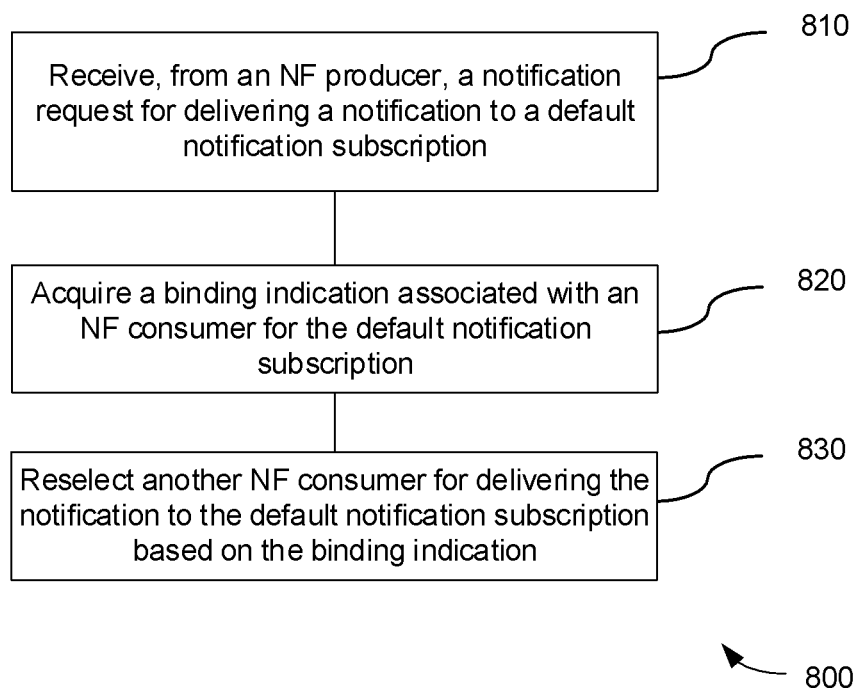
FIG. 8 is a flowchart illustrating a method in an SCP according to yet another embodiment of the present disclosure.

FIG. 8 is a flowchart illustrating a method 800 according to an embodiment of the present disclosure. The method 800 can be performed at an SCP or a network node implementing an SCP function.

At block 810, a notification request for delivering a notification to a default notification subscription is received, from an NF producer.

At block 820, a binding indication associated with an NF consumer for the default notification subscription is acquired.

Here, in the block 820, the binding indication can be acquired from an NRF in an NF discovery process. Alternatively, in the block 820, the binding indication can be extracted from the notification request received from the NF producer.

In an example, the binding indication may indicate a binding level set to an NF service instance, an NF service set, an NF instance, or an NF set. The binding indication may be carried in a 3gpp-sbi-binding header or a 3gpp-sbi-routing-binding header.

In an example, the binding indication may include one or more of: a notification type, an N1 message class, an N2 information class, or a scope associated with the default notification subscription. Alternatively, the notification request may further indicate one or more of the notification type, the N1 message class, the N2 information class, or the scope. Here, at least one of the notification type, the N1 message class, the N2 information class, or the scope may be carried in a header from which a query parameter for NF discovery is derivable.

At block 830, another NF consumer is reselected for delivering the notification to the default notification subscription based on the binding indication.

In an example, the reselecting in the block 830 may be performed in response to a failure, load balancing, or load rebalancing associated with the NF consumer. For details of reselection based on the binding indication, reference can be made to the above Table 1.

Some exemplary embodiments of the present disclosure will be described below.

An NF Service Consumer may provide a Binding Indication value for a default notification subscription in its NF profile in an NRF.

For a default notification subscription, an NF Service Producer shall fetch the Binding Indication value (if available) from the NF profile of the NF Service Consumer and include it in a 3gpp-Sbi-Routing-Binding header in related notification requests. For notifications corresponding to default notification subscriptions using Indirect Communication with Delegated Discovery, when the notification is targeting a specific NF instance/NF service instance, the SCP shall fetch the Binding Indication value (if available) for the default notification subscription from the NF profile of the NF Service Consumer.

For a default notification subscription, an NF Service Consumer shall update the Binding Indication value in NF profile when binding information of the default notification subscription has changed.

The above Table 4 can be extended to include a binding indication, as shown in Table 6 below:

TABLE 6

Definition of type DefaultNotificationSubscription

| Attribute name | Data type | P | Cardinality | Description |
| --- | --- | --- | --- | --- |
| notificationType | NotificationType | M | 1 | Type of notification for which the corresponding callback URI is provided. |
| callbackUri | Uri | M | 1 | This attribute contains a default notification endpoint to be used by a NF Service Producer towards an NF Service Consumer that has not registered explicitly a callback URI in the NF Service Producer (e.g. as a result of an implicit subscription). |
| n1MessageClass | N1MessageClass | C | 0 . . . 1 | If the notification type is N1_MESSAGES, this IE shall be present and shall identify the class of N1 messages to be notified. |
| n2InformationClass | N2InformationClass | C | 0 . . . 1 | If the notification type is N2_INFORMATION, this IE shall be present and shall identify the class of N2 information to be notified. |
| versions | array(string) | O | 1 . . . N | API versions (e.g. "v1") supported for the default notification type. |
| binding | string | O | 0 . . . 1 | When present, this IE shall contain the value of the Binding Indication for the default subscription notification (i.e. the value part of "3gpp-Sbi-Binding" header), as specified in clause 6.12.4 of 3GPP TS 29.500. |

When an HTTP client sends a notification request corresponding to default notification subscription where the target URI is unknown (e.g. for Indirect Communication with Delegated Discovery,), it shall use pseudo target URI for default subscription ("/scp-default-sub-notify-uri") in the ":path".

If pseudo target URI for default subscription ("/scp-default-sub-notify-uri") is present in the ":path", the SCP shall replace it with the real path of the target URI registered in the selected default subscription.

For indirect communication with Delegated Discovery, if the NF Service Producer needs to send a notification request to a default subscription and the SCP selects a target default notification subscription (with callback URI "https://example.com/a/b/c/notification" registered):
  the NF service producer shall send the request "POST https://scp.com/1/2/3/scp-default-sub-notify-uri" to the SCP (where "1/2/3" is the "apiPrefix" of the SCP).
  the SCP shall send the request "POST https://example.com/a/b/c/notification" to the selected NF Service Consumer.

The 3gpp-Sbi-Discovery-notification-type header can be set to the type of notification being set:
  the 3gpp-Sbi-Discovery-n1-msg-class header set to the N1 Message Class of the target default subscription if notification type is "N1_MESSAGE"; or
  the 3gpp-Sbi-Discovery-n2-info-class header set to the N2 Information Class of the target default subscription if the notification type is "N2_INFORMATION";

The URI query parameters supported HTTP GET method, as defined in clause 6.2.3.2.3.1 of TS 29.510, V16.4.0, can be extended to support N1 Message Class and N2 Information Class, as shown in Table 7 below.

TABLE 7

URI query parameters supported by the GET method on this resource

| Name | Data type | P | Cardinality | Description | Applicability |
|---|---|---|---|---|---|
| n1-msg-class | N1MessageClass | O | 0 . . . 1 | This IE may be included when "notification-type" IE is present with value "N1_MESSAGES". When included, this IE shall contain the N1 message class of default notification subscriptions that shall be registered in the NFProfile or NFService of the NF Instances being discovered. The NF profiles returned by the NRF shall contain all the registered default notification subscriptions, including the one corresponding to the n1-msg-class parameter. | Query-Params-Ext2 |
| n2-info-class | N2InformationClass | O | 0 . . . 1 | This IE may be included when "notification-type" IE is present with value "N2_INFORMATION". If included, this IE shall contain the notification type of default notification subscriptions that shall be registered in the NFProfile or NFService of the NF Instances being discovered. The NF profiles returned by the NRF shall contain all the registered default notification subscriptions, including the one corresponding to the n2-info-class parameter. | Query-Params-Ext2 |

Features supported by the NFDiscovery service, as defined in clause 6.2.9 of TS 29.510, can be extended to support N1 Message Class and N2 Information Class, as shown in Table 8 below.

TABLE 8

Features of supportedFeatures attribute used by Nnrf_NFDiscovery service

| Feature Number | Feature | M/O | Description |
|---|---|---|---|
| 1 | Complex-Query | O | Support of Complex Query expression |
| 2 | Query-Params-Ext1 | O | Support of the following query parameters: limit max-payload-size required-features pdu-session-types |
| 3 | Query-Param-Analytics | O | Support of the query parameters for Analytics identifier: event-id-list nwdaf-event-list |

TABLE 8-continued

Features of supportedFeatures attribute used by Nnrf_NFDiscovery service

| Feature Number | Feature | M/O | Description |
|---|---|---|---|
| 4 | MAPDU | O | This feature indicates whether the NRF supports selection of UPF with ATSSS capability. |
| 5 | Query-Params-Ext2 | O | Support of the following query parameters: requester-nf-instance-id upf-ue-ip-addr-ind pfd-data target-snpn af-ee-data w-agf-info tngf-info twif-info target-nf-set-id target-nf-service-set-id preferred-tai nef-id preferred-nf-instances notification-type n1-msg-class n2-info-class serving-scope internal-group-identity preferred-api-versions v2x-support-ind redundant-gtpu redundant-transport lmf-id an-node-type rat-type ipups scp-domain-list address-domain ipv4-addr ipv6-prefix served-nf-set-id served-nf-type remote-plmn-id data-forwarding preferred-full-plmn requester-snpn-list max-payload-size-ext |
| 6 | Service-Map | M | This feature indicates whether it is supported to identify the list of NF Service Instances as a map (i.e. the "nfServiceList" attribute of NFProfile is supported). |

In the following, the above methods 200-800 will be further explained with reference to illustrative examples shown in FIGS. 9-11.

Figure 9:
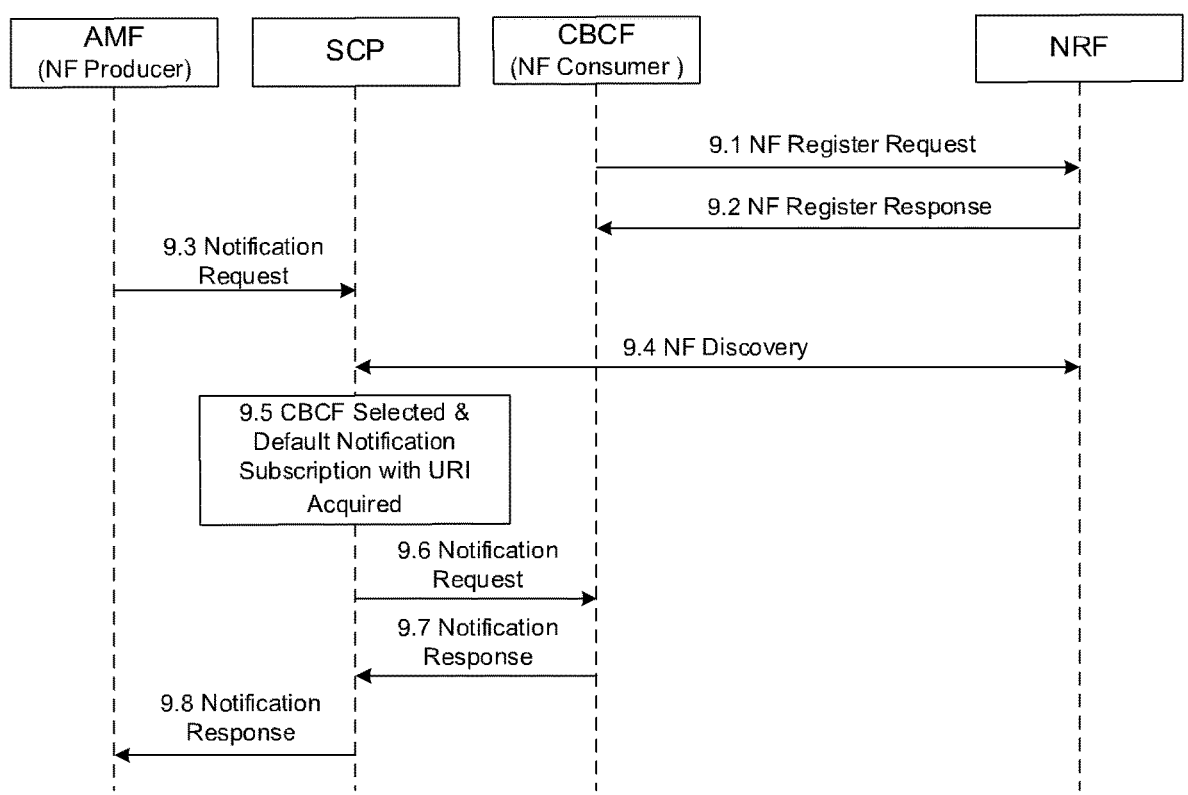
FIG. 9 is a sequence diagram showing an exemplary process for notification delivery according to an embodiment of the present disclosure.

FIG. 9 is a sequence diagram showing an exemplary process for notification delivery according to an embodiment of the present disclosure. In this example, a target NF consumer is selected by an SCP.

At 9.1, a CBCF, as an NF consumer in this example, sends an NF register request to an NRF. The NF register request may contain a default notification subscription "N2_INFORMATION/PWS-RF" (notification type=N2 information; N2 information class=PWS-RF), as well as a binding indication: bl="nfset"; nf-set-id="Cbcf-Set1". At 9.2, the NRF responds with an NF register response. At 9.3, an AMF, as an NF producer in this example, sends a notification request (e.g., an N2 notification request, which may be triggered in response to receiving an N2 restart indication from a Radio Access Network (RAN)) to an SCP. The notification request may contain a request URI "http(s)://{authority of SCP}/default-subscription" and may be e.g.:

POST http(s)://{authority of SCP}/default-subscription
3gpp-sbi-discovery-notification-type: N2_INFORMATION
3gpp-sbi-discovery-n2-info-class: PWS-RF At 9.4, the SCP performs an NF discovery towards the NRF for target NF consumer candidates, e.g., using query parameters such as notification-type="N2_INFORMATION" and n2-info-class="PWS-RF", and acquires from the NRF a list of candidates and their respective NF profiles. At 9.5, the SCP selects the CBCF from the list as the target NF consumer and acquires, from the NF profile of the CBCF, the default notification subscription and a URI associated with the default notification subscription. At 9.6, the SCP forwards the notification request to the CBCF, with the request URI replaced with the callback URI. Then, the CBCF sends a notification response (e.g., N2 notification response) to the SCP at 9.7, and the SCP forwards the notification response to the AMF at 9.8.

Figure 10:
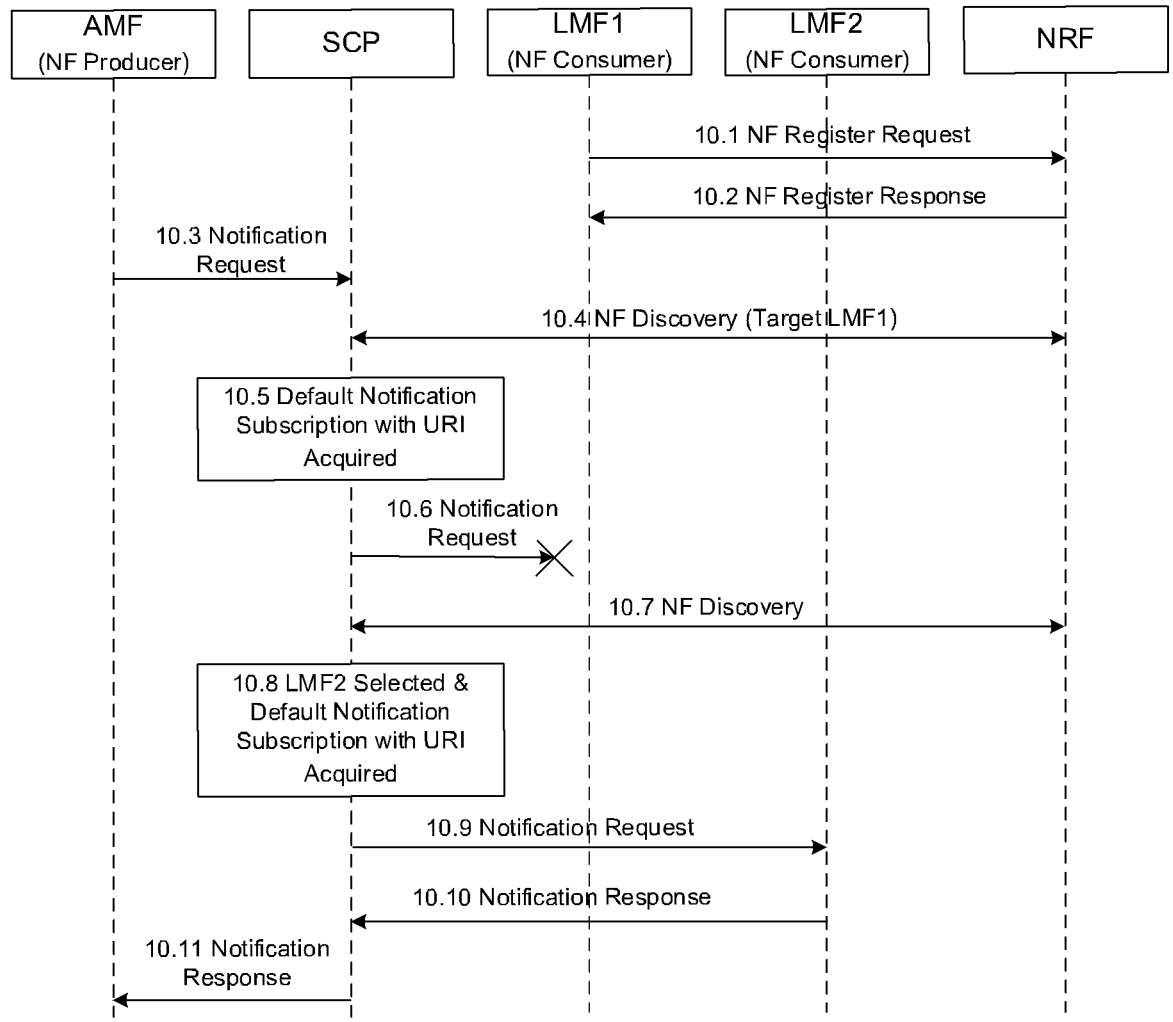
FIG. 10 is a sequence diagram showing an exemplary process for notification delivery according to another embodiment of the present disclosure.

FIG. 10 is a sequence diagram showing an exemplary process for notification delivery according to an embodiment of the present disclosure. In this example, a target NF consumer is initially specified by an NF producer and then reselected by an SCP.

At 10.1, an LMF (denoted as LMF1), as an NF consumer in this example, sends an NF register request to an NRF. The NF register request may contain a default notification subscription "N1_MESSAGE/LPP" (notification type=N1 message; N1 message class=LPP), as well as a binding indication: bl="nfset"; nf-set-id="LMF-Set1". At 10.2, the NRF responds with an NF register response. Then, LMF1 may send an N1 LPP request to a UE via an AMF. Upon receiving an N1 LPP response from the UE, the AMF, as an NF producer in this example, sends a notification request (e.g., an N1 notification request) to an SCP at 10.3, specifying LMF1 as the target NF consumer. The notification request may contain a request URI "http(s)://{authority of SCP}/default-subscription" and may be e.g.:

POST http(s)://{authority of SCP}/default-subscription
3gpp-sbi-discovery-target-nf-instance-id: LMF1 Instance Id
3gpp-sbi-discovery-notification-type: N1_MESSAGE
3gpp-sbi-discovery-n1-msg-class: LPP At 10.4, the SCP performs an NF discovery towards the NRF, with LMF1 as the target NF consumer, and acquires from the NRF an NF profile of LMF1. At 10.5, the SCP acquires, from the NF profile of LMF1, the default notification subscription and a URI associated with the default notification subscription for LMF1. At 10.6, the SCP forwards the notification request to the LMF1, with the request URI replaced with the callback URI. However, the forwarding at 10.6 fails, e.g., due to failure of LMF1. At 10.7, the SCP performs an NF discovery towards the NRF, using the binding indication, and acquires, from the NRF, a list of target NF consumer candidates matching the binding indication (e.g., belonging to the NF Set "LMF-Set1") and their respective NF profiles. At 10.8, the SCP reselects another LMF (denoted as LMF2) from the list as a new target NF consumer and acquires, from the NF profile of LMF2, the default notification subscription and a new URI associated with the default notification subscription for LMF2. At 10.9, the SCP forwards the notification request to LMF2, with the request URI replaced with the new callback URI. Then, LMF2 sends a notification response (e.g., N1 notification response) to the SCP at 10.10, and the SCP forwards the notification response to the AMF at 10.11.

Figure 11:
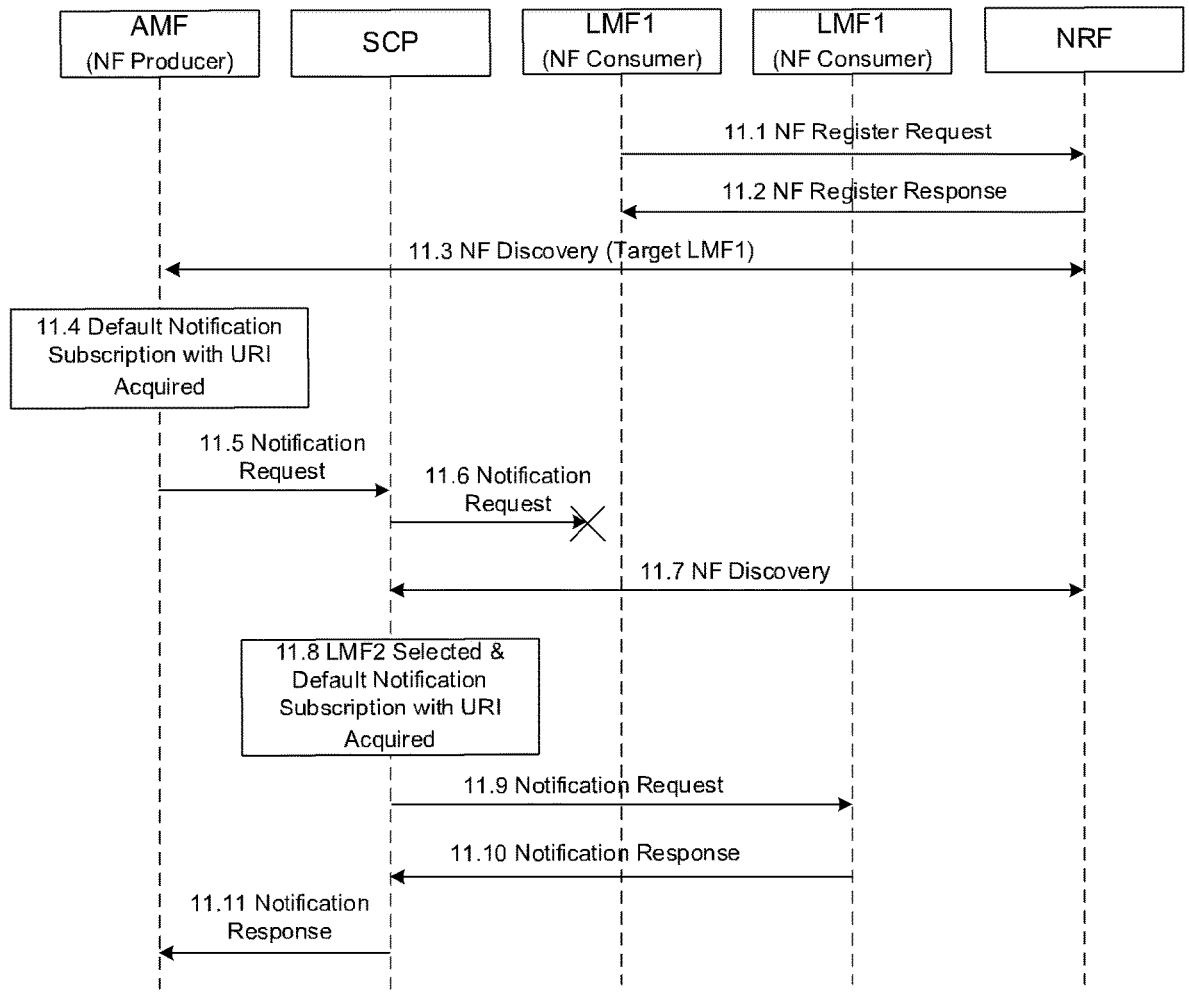
FIG. 11 is a sequence diagram showing an exemplary process for notification delivery according to yet another embodiment of the present disclosure.

FIG. 11 is a sequence diagram showing an exemplary process for notification delivery according to an embodiment of the present disclosure. In this example, a target NF consumer is initially selected by an NF producer and then reselected by an SCP.

At 11.1, an LMF (denoted as LMF1), as an NF consumer in this example, sends an NF register request to an NRF. The NF register request may contain a default notification subscription "N1_MESSAGE/LPP" (notification type=N1 message; N1 message class=LPP), as well as a binding indication: bl="nfset"; nf-set-id="LMF-Set1". At 11.2, the NRF responds with an NF register response. Then, LMF1 may send an N1 LPP request to a UE via an AMF. Upon receiving an N1 LPP response from the UE, the AMF, as an NF producer in this example, performs an NF discovery towards the NRF at 11.3, with LMF1 as the target NF consumer, and acquires from the NRF an NF profile of LMF1. At 11.4, the AMF acquires, from the NF profile of LMF1, the default notification subscription and a URI associated with the default notification subscription for LMF1. At 11.5, the AMF sends a notification request (e.g., an N1 notification request) to an SCP. The notification request contains the callback URI and may be e.g.:

POST {callback URI associated with default subscription for LMF1}
3gpp-sbi-Routing-Binding: bl="nfset"; nf-set-id="LMF-Set1"
3gpp-sbi-discovery-notification-type: N1_MESSAGE
3gpp-sbi-discovery-n1-msg-class: LPP At 11.6, the SCP forwards the notification request to the LMF1, with the callback URI. However, the forwarding at 11.6 fails, e.g., due to failure of LMF1. At 11.7, the SCP performs an NF discovery towards the NRF, using the binding indication, and acquires, from the NRF, a list of target NF consumer candidates matching the binding indication (e.g., belonging to the NF Set "LMF-Set1") and their respective NF profiles. At 11.8, the SCP reselects another LMF (denoted as LMF2) from the list as a new target NF consumer and acquires, from the NF profile of LMF2, the default notification subscription and a new URI associated with the default notification subscription for LMF2. At 11.9, the SCP forwards the notification request to LMF2, with the new callback URI. Then, LMF2 sends a notification response (e.g., N1 notification response) to the SCP at 11.10, and the SCP forwards the notification response to the AMF at 11.11.

Figure 12:
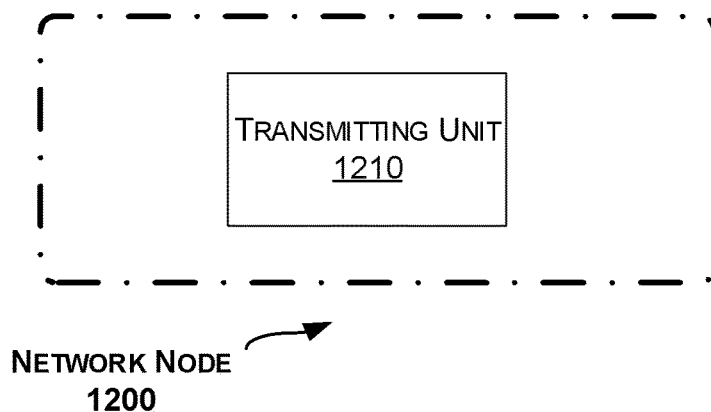
FIG. 12 is a block diagram of a network node according to an embodiment of the present disclosure.

Correspondingly to the method 200 as described above, a network node is provided. FIG. 12 is a block diagram of a network node 1200 according to an embodiment of the present disclosure. The network node 1200 can be configured to implement an NF producer.

As shown in FIG. 12, the network node 1200 includes a transmitting unit 1210 configured to transmit, to an SCP, a notification request for delivering a notification. The notification request contains a URI having a predetermined service path indicating that the notification request is associated with a default notification subscription.

In an embodiment, the notification request may further contain one or more parameters required for the SCP to select a target NF consumer of the notification.

In an embodiment, the one or more parameters may include at least one of an N1 message class and an N2 information class for the notification.

The unit 1210 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 13:
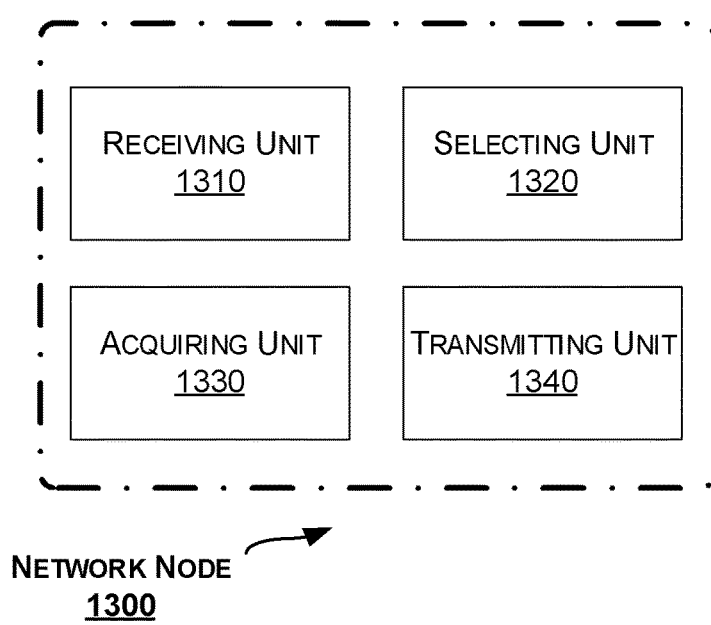
FIG. 13 is a block diagram of a network node according to an embodiment of the present disclosure.

Correspondingly to the method 300 as described above, a network node is provided. FIG. 13 is a block diagram of a network node 1300 according to an embodiment of the present disclosure. The network node 1300 can be configured to implement an SCP function.

As shown in FIG. 13, the network node 1300 includes a receiving unit 1310 configured to receive, from an NF producer, a notification request for delivering a notification, the notification request containing a URI having a predetermined service path indicating that the notification request is associated with a default notification subscription. The network node 1300 further includes a selecting unit 1320 configured to select a target NF consumer of the notification based on the notification request. The network node 1300 further includes an acquiring unit 1330 configured to acquire a callback URI associated with the default notification subscription for the target NF consumer. The network node 1300 further includes a transmitting unit 1340 configured to transmit the notification to the target NF consumer using the callback URI.

In an embodiment, the notification request may further contain one or more parameters required for the SCP to select the target NF consumer.

In an embodiment, the one or more parameters may include at least one of an N1 message class and an N2 information class for the notification.

In an embodiment, the selecting unit 1320 may be configured to perform a discovery towards an NRF based on the one or more parameters. The acquiring unit 1330 may be configured to acquire the callback URI from an NF profile returned by the NRF.

The units 1310-1340 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 14:
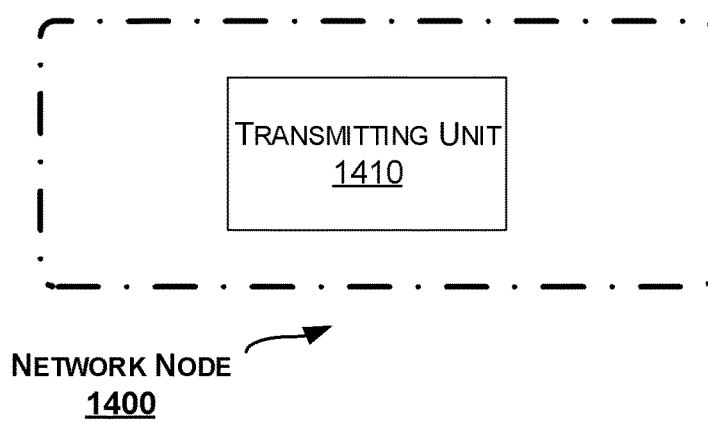
FIG. 14 is a block diagram of a network node according to an embodiment of the present disclosure.

Correspondingly to the method 400 as described above, a network node is provided. FIG. 14 is a block diagram of a network node 1400 according to an embodiment of the present disclosure. The network node 1400 can be configured to implement an NF producer.

As shown in FIG. 14, the network node 1400 includes a transmitting unit 1410 configured to transmit, to an SCP, a notification request for delivering a notification to a default notification subscription. The notification request indicates at least one of an N1 message class and an N2 information class for the notification.

In an embodiment, the N1 message class or the N2 information class may be carried in a header from which a query parameter for NF discovery is derivable.

The unit 1410 can be implemented as a pure hardware solution or as a 35 combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 15:
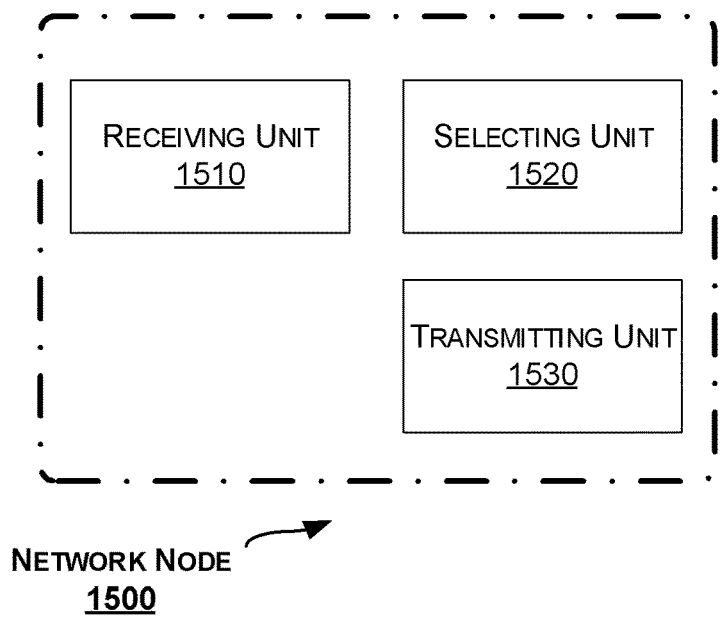
FIG. 15 is a block diagram of a network node according to an embodiment of the present disclosure.

Correspondingly to the method 500 as described above, a network node is provided. FIG. 15 is a block diagram of a network node 1500 according to an embodiment of the present disclosure. The network node 1500 can be configured to implement an SCP function.

As shown in FIG. 15, the network node 1500 includes a receiving unit 1510 configured to receive, from an NF producer, a notification request for delivering a notification to a default notification subscription, the notification request indicating at least one of an N1 message class and an N2 information class for the notification. The network node 1500 further includes a selecting unit 1520 configured to select or reselect a target NF consumer of the notification based on the notification request. The network node 1500 further includes a transmitting unit 1530 configured to transmitting the notification to the target NF consumer.

In an embodiment, the N1 message class or the N2 information class may be carried in a header from which a query parameter for NF discovery is derivable.

In an embodiment, the selecting unit 1520 may be configured to perform a discovery towards an NRF based on the N1 message class and/or the N2 information class.

The units 1510-1530 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 5.

Figure 16:
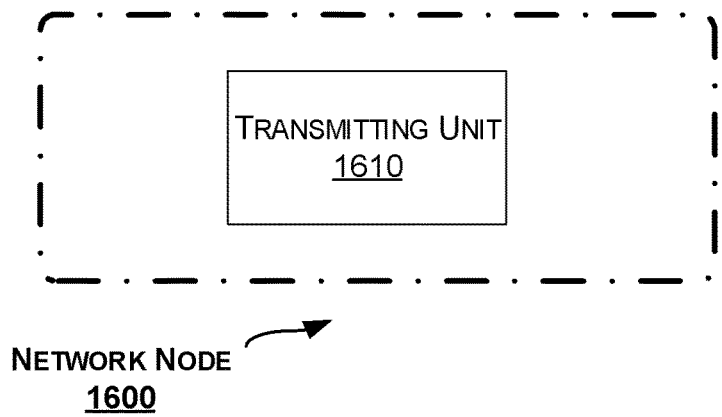
FIG. 16 is a block diagram of a network node according to an embodiment of the present disclosure.

Correspondingly to the method 600 as described above, a network node is provided. FIG. 16 is a block diagram of a network node 1600 according to an embodiment of the present disclosure. The network node 1600 can be configured to implement an NF consumer.

As shown in FIG. 16, the network node 1600 includes a transmitting unit 1610 configured to transmit, to an NRF, an NF register request, the NF register request containing a binding indication associated with the NF consumer for a default notification subscription. Alternatively, the transmitting unit 1610 may be configured to transmit, to an NF producer, a binding indication associated with the NF consumer for a default notification subscription in a service request that triggers delivering of a notification to the default notification subscription.

In an embodiment, the binding indication may indicate a binding level set to an NF service instance, an NF service set, an NF instance, or an NF set; and/or the binding indication may be carried in a 3gpp-sbi-binding header or a 3gpp-sbi-routing-binding header.

The unit 1610 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 6.

Figure 17:
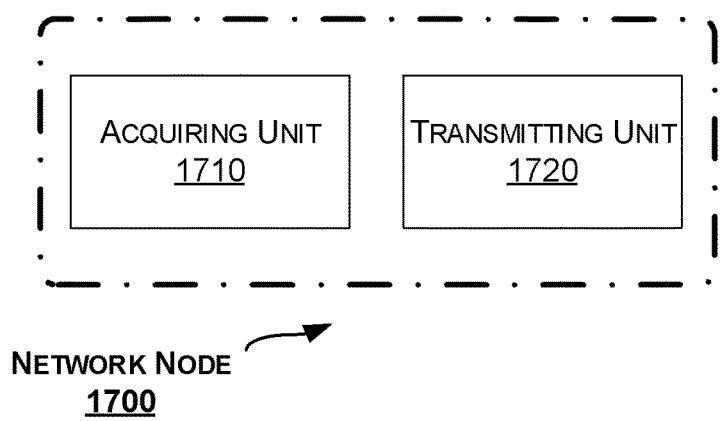
FIG. 17 is a block diagram of a network node according to an embodiment of the present disclosure.

Correspondingly to the method 700 as described above, a network node is provided. FIG. 17 is a block diagram of a network node 1700 according to an embodiment of the present disclosure. The network node 1700 can be configured to implement an NF producer.

As shown in FIG. 17, the network node 1700 includes an acquiring unit 1710 configured to acquire a binding indication associated with an NF consumer for a default notification subscription. The network node 1700 further includes a transmitting unit 1720 configured to transmit, to an SCP, a notification request for delivering a notification to the default notification subscription. The notification request contains the binding indication.

In an embodiment, the acquiring unit 1710 may be configured to: acquire the binding indication from an NRF in an NF discovery process; or acquire the binding indication from the NF consumer in a service request that triggers the delivering of the notification to the default notification subscription.

In an embodiment, the binding indication may include one or more of: a notification type, an N1 message class, an N2 information class, or a scope associated with the default notification subscription.

In an embodiment, the notification request may further indicate one or more of: a notification type, an N1 message class, an N2 information class, or a scope associated with the default notification subscription.

In an embodiment, at least one of the notification type, the N1 message class, the N2 information class, or the scope may be carried in a header from which a query parameter for NF discovery is derivable.

In an embodiment, the binding indication may indicate a binding level set to an NF service instance, an NF service set, an NF instance, or an NF set; and/or the binding indication may be carried in a 3gpp-sbi-binding header or a 3gpp-sbi-routing-binding header.

The units 1710-1720 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 7.

Figure 18:
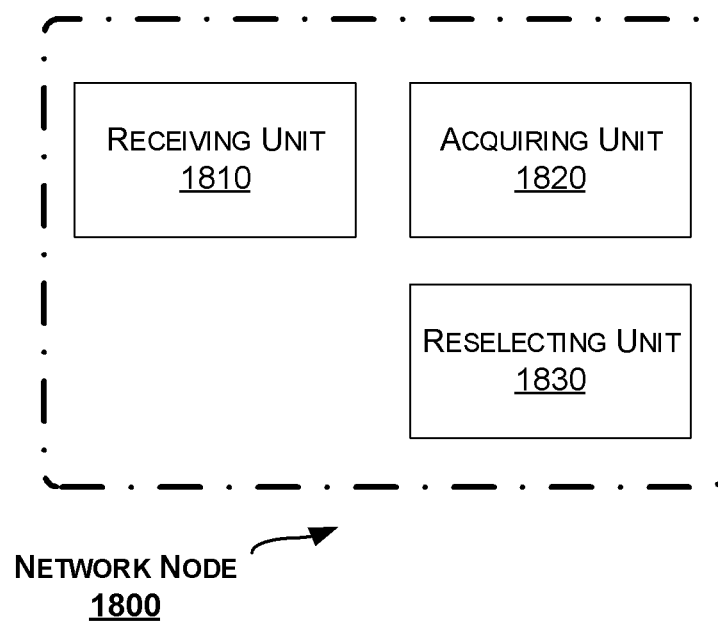
FIG. 18 is a block diagram of a network node according to an embodiment of the present disclosure.

Correspondingly to the method 800 as described above, a network node is provided. FIG. 18 is a block diagram of a network node 1800 according to an embodiment of the present disclosure. The network node 1800 can be configured to implement an SCP function.

As shown in FIG. 18, the network node 1800 includes a receiving unit 1810 configured to receive, from an NF producer, a notification request for delivering a notification to a default notification subscription. The network node 1800 further includes an acquiring unit 1820 configured to acquire a binding indication associated with an NF consumer for the default notification subscription. The network node 1800 further includes a reselecting unit 1830 configured to reselect another NF consumer for delivering the notification to the default notification subscription based on the binding indication.

In an embodiment, the acquiring unit 1820 may be configured to: acquire the binding indication from an NRF, in an NF discovery process, or extract the binding indication from the notification request received from the NF producer.

In an embodiment, the binding indication may include one or more of: a notification type, an N1 message class, an N2 information class, or a scope associated with the default notification subscription.

In an embodiment, the notification request may further indicate one or more of: a notification type, an N1 message class, an N2 information class, or a scope associated with the default notification subscription.

In an embodiment, at least one of the notification type, the N1 message class, the N2 information class, or the scope may be carried in a header from which a query parameter for NF discovery is derivable.

In an embodiment, the operation of reselecting may be in response to a failure, load balancing, or load rebalancing associated with the NF consumer.

In an embodiment, the binding indication may indicate a binding level set to an NF service instance, an NF service set, an NF instance, or an NF set; and/or the binding indication may be carried in a 3gpp-sbi-binding header or a 3gpp-sbi-routing-binding header.

The units 1810-1830 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 8.

Figure 19:
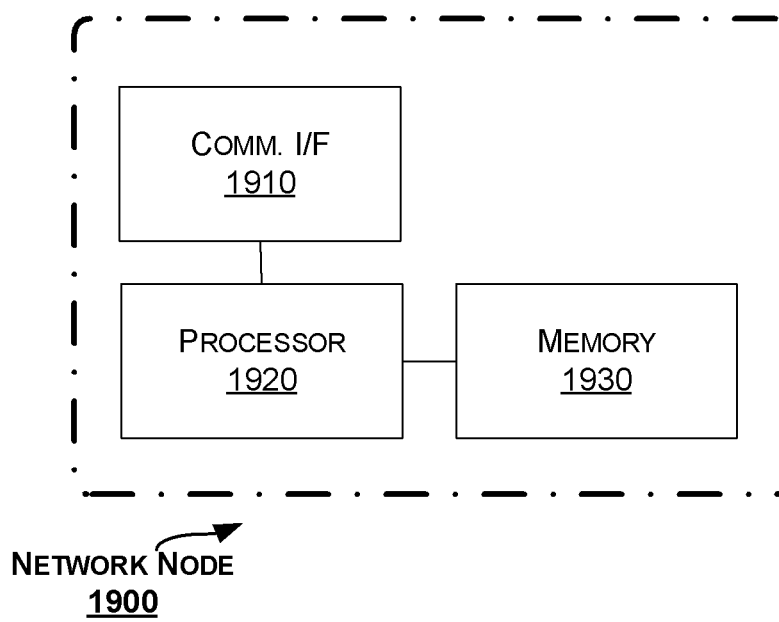
FIG. 19 is a block diagram of a network node according to another embodiment of the present disclosure.

FIG. 19 is a block diagram of a network node 1900 according to another embodiment of the present disclosure.

The network node 1900 includes a communication interface 1910, a processor 1920 and a memory 1930.

The memory 1930 may contain instructions executable by the processor 1920 whereby the network node 1900 is operative to, when implementing an NF producer, perform the actions, e.g., of the procedure described earlier in conjunction with FIG. 2. Particularly, the memory 1930 may contain instructions executable by the processor 1920 whereby the network node 1900 is operative to, when implementing an NF producer: transmit, to an SCP, a notification request for delivering a notification. The notification request contains a URI having a predetermined service path indicating that the notification request is associated with a default notification subscription.

In an embodiment, the notification request may further contain one or more parameters required for the SCP to select a target NF consumer of the notification.

In an embodiment, the one or more parameters may include at least one of an N1 message class and an N2 information class for the notification.

Alternatively, the memory 1930 may contain instructions executable by the processor 1920 whereby the network node 1900 is operative to, when implementing an SCP function, perform the actions, e.g., of the procedure described earlier in conjunction with FIG. 3. Particularly, the memory 1930 may contain instructions executable by the processor 1920 whereby the network node 1900 is operative to, when implementing an SCP function: receive, from an NF producer, a notification request for delivering a notification, the notification request containing a URI having a predetermined service path indicating that the notification request is associated with a default notification subscription; select a target NF consumer of the notification based on the notification request; acquire a callback URI associated with the default notification subscription for the target NF consumer; and transmit the notification to the target NF consumer using the callback URI.

In an embodiment, the notification request may further contain one or more parameters required for the SCP to select the target NF consumer.

In an embodiment, the one or more parameters may include at least one of an N1 message class and an N2 information class for the notification.

In an embodiment, the operation of selecting may include performing a discovery towards an NRF based on the one or more parameters, and the operation of acquiring may include acquiring the callback URI from an NF profile returned by the NRF.

Alternatively, the memory 1930 may contain instructions executable by the processor 1920 whereby the network node 1900 is operative to, when implementing an NF producer, perform the actions, e.g., of the procedure described earlier in conjunction with FIG. 4. Particularly, the memory 1930 may contain instructions executable by the processor 1920 whereby the network node 1900 is operative to, when implementing an NF producer: transmit, to an SCP, a notification request for delivering a notification to a default notification subscription. The notification request indicates at least one of an N1 message class and an N2 information class for the notification.

In an embodiment, the N1 message class or the N2 information class may be carried in a header from which a query parameter for NF discovery is derivable.

Alternatively, the memory 1930 may contain instructions executable by the processor 1920 whereby the network node 1900 is operative to, when implementing an SCP function, perform the actions, e.g., of the procedure described earlier in conjunction with FIG. 5. Particularly, the memory 1930 may contain instructions executable by the processor 1920 whereby the network node 1900 is operative to, when implementing an SCP function: receive, from an NF producer, a notification request for delivering a notification to a default notification subscription, the notification request indicating at least one of an N1 message class and an N2 information class for the notification; select or reselect a target NF consumer of the notification based on the notification request; transmit the notification to the target NF consumer.

In an embodiment, the N1 message class or the N2 information class may be carried in a header from which a query parameter for NF discovery is derivable.

In an embodiment, the operation of selecting or reselecting may include performing a discovery towards an NRF based on the N1 message class and/or the N2 information class.

Alternatively, the memory 1930 may contain instructions executable by the processor 1920 whereby the network node 1900 is operative to, when implementing an NF consumer, perform the actions, e.g., of the procedure described earlier in conjunction with FIG. 6. Particularly, the memory 1930 may contain instructions executable by the processor 1920 whereby the network node 1900 is operative to, when implementing an NF consumer: transmit, to an NRF, an NF register request, the NF register request containing a binding indication associated with the NF consumer for a default notification subscription; or transmit, to an NF producer, a binding indication associated with the NF consumer for a default notification subscription in a service request that triggers delivering of a notification to the default notification subscription.

In an embodiment, the binding indication may indicate a binding level set to an NF service instance, an NF service set, an NF instance, or an NF set; and/or the binding indication may be carried in a 3gpp-sbi-binding header or a 3gpp-sbi-routing-binding header.

Alternatively, the memory 1930 may contain instructions executable by the processor 1920 whereby the network node 1900 is operative to, when implementing an NF producer, perform the actions, e.g., of the procedure described earlier in conjunction with FIG. 7. Particularly, the memory 1930 may contain instructions executable by the processor 1920 whereby the network node 1900 is operative to, when implementing an NF producer: acquire a binding indication associated with an NF consumer for a default notification subscription; and transmit, to an SCP, a notification request for delivering a notification to the default notification subscription. The notification request contains the binding indication.

In an embodiment, the operation of acquiring may include: acquiring the binding indication from an NRF in an NF discovery process; or acquiring the binding indication from the NF consumer in a service request that triggers the delivering of the notification to the default notification subscription.

In an embodiment, the binding indication may include one or more of: a notification type, an N1 message class, an N2 information class, or a scope associated with the default notification subscription.

In an embodiment, the notification request may further indicate one or more of: a notification type, an N1 message class, an N2 information class, or a scope associated with the default notification subscription.

In an embodiment, at least one of the notification type, the N1 message class, the N2 information class, or the scope may be carried in a header from which a query parameter for NF discovery is derivable.

In an embodiment, the binding indication may indicate a binding level set to an NF service instance, an NF service set, an NF instance, or an NF set; and/or the binding indication may be carried in a 3gpp-sbi-binding header or a 3gpp-sbi-routing-binding header.

Alternatively, the memory 1930 may contain instructions executable by the processor 1920 whereby the network node 1900 is operative to, when implementing an SCP function, perform the actions, e.g., of the procedure described earlier in conjunction with FIG. 8. Particularly, the memory 1930 may contain instructions executable by the processor 1920 whereby the network node 1900 is operative to, when implementing an SCP function: receive, from an NF producer, a notification request for delivering a notification to a default notification subscription; acquire a binding indication associated with an NF consumer for the default notification subscription; and reselect another NF consumer for delivering the notification to the default notification subscription based on the binding indication.

In an embodiment, the operation of acquiring may include: acquiring the binding indication from an NRF, in an NF discovery process, or extracting the binding indication from the notification request received from the NF producer.

In an embodiment, the binding indication may include one or more of: a notification type, an N1 message class, an N2 information class, or a scope associated with the default notification subscription.

In an embodiment, the notification request may further indicate one or more of: a notification type, an N1 message class, an N2 information class, or a scope associated with the default notification subscription.

In an embodiment, at least one of the notification type, the N1 message class, the N2 information class, or the scope may be carried in a header from which a query parameter for NF discovery is derivable.

In an embodiment, the operation of reselecting may be in response to a failure, load balancing, or load rebalancing associated with the NF consumer.

In an embodiment, the binding indication may indicate a binding level set to an NF service instance, an NF service set, an NF instance, or an NF set; and/or the binding indication may be carried in a 3gpp-sbi-binding header or a 3gpp-sbi-routing-binding header.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1920 causes the network node 1900 to perform the actions, e.g., of the procedure described earlier in conjunction with FIG. 2, 3, 4, 5, 6, 7, or 8.

The computer program product may be configured as a computer program code structured in computer program modules. The computer program modules could essentially perform the actions of the flow illustrated in FIG. 2, 3, 4, 5, 6, 7, or 8.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried in a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Network Function, NF, producer, comprising:
transmitting, to a Service Communication Proxy, SCP, a notification request for delivering a notification, wherein the notification request contains a Uniform Resource Identifier, URI, having a predetermined service path indicating that the notification request is associated with a default notification subscription for which a callback URI is acquired to replace the URI as a target URI of the notification from the NF producer, wherein the notification request further contains one or more parameters required for the SCP to select a target NF consumer of the notification; and wherein the one or more parameters comprise at least one of an N1 message class and an N2 information class for the notification.

2. A method in a network node implementing a Service Communication Proxy, SCP, function, comprising:
receiving, from a Network Function, NF, producer, a notification request for delivering a notification, wherein the notification request contains a Uniform Resource Identifier, URI, having a predetermined service path indicating that the notification request is associated with a default notification subscription for which a callback URI is acquired to replace the URI as a target URI of the notification from the NF producer;
selecting a target NF consumer of the notification based on the notification request;
acquiring the callback URI associated with the default notification subscription for the target NF consumer; and
transmitting the notification to the target NF consumer using the callback URI, wherein the notification request further contains one or more parameters required for the SCP to select the target NF consumer; and wherein the one or more parameters comprise at least one of an N1 message class and an N2 information class for the notification.

3. The method of claim 2, wherein said selecting comprises performing a discovery towards an NF Repository Function, NRF, based on the one or more parameters, and said acquiring comprises acquiring the callback URI from an NF profile returned by the NRF.

4. A method in a Network Function, NF, producer, comprising:
transmitting, to a Service Communication Proxy, SCP, a notification request for delivering a notification to a default notification subscription for which a callback Uniform Resource Identifier, URI, is acquired to replace the URI as a target URI of the notification from the NF producer, wherein the notification request contains a Uniform Resource Identifier, URI, having a predetermined service path indicating that the notification request is associated with a default notification subscription, and the notification request indicates at least one of an N1 message class and an N2 information class for the notification.

5. The method of claim 4, wherein the N1 message class or the N2 information class is carried in a header from which a query parameter for NF discovery is derivable.

6. A method in a network node implementing a Service Communication Proxy, SCP, function, comprising:
receiving, from a Network Function, NF, producer, a notification request for delivering a notification to a default notification subscription for which a callback Uniform Resource Identifier, URI, is acquired to replace the URI as a target URI of the notification from the NF producer, wherein the notification request contains a Uniform Resource Identifier, URI, having a predetermined service path indicating that the notification request is associated with a default notification subscription, and the notification request indicates at least one of an N1 message class and an N2 information class for the notification;
selecting or reselecting a target NF consumer of the notification based on the notification request; and
transmitting the notification to the target NF consumer.

7. The method of claim 6, wherein the N1 message class or the N2 information class is carried in a header from which a query parameter for NF discovery is derivable.

8. The method of claim 6, wherein said selecting or reselecting comprises performing a discovery towards an NF Repository Function, NRF, based on the N1 message class and/or the N2 information class.

9. A method in a Network Function, NF, consumer, comprising:
transmitting, to an NF Repository Function, NRF, an NF register request, wherein the NF register request contains a binding indication associated with the NF consumer for a default notification subscription for which a callback Uniform Resource Identifier, URI, is acquired to replace the URI as a target URI of the notification from the NF producer; or
transmitting, to an NF producer, a binding indication associated with the NF consumer for a default notification subscription in a service request that triggers delivering of a notification to the default notification subscription,
wherein the binding indication comprises one or more of:
a notification type,
an N1 message class,
an N2 information class, or
a scope associated with the default notification subscription.

10. The method of claim 9, wherein the binding indication indicates a binding level set to an NF service instance, an NF service set, an NF instance, or an NF set; and/or wherein the binding indication is carried in a 3gpp-sbi-binding header or a 3gpp-sbi-routing-binding header.

11. A method in a Network Function, NF, producer, comprising:
acquiring a binding indication associated with an NF consumer for a default notification subscription for which a callback Uniform Resource Identifier, URI, is acquired to replace the URI as a target URI of the notification from the NF producer; and
transmitting, to a Service Communication Proxy, SCP, a notification request for delivering a notification to the default notification subscription, wherein the notification request contains the binding indication, and wherein the binding indication comprises one or more of:
a notification type,
an N1 message class,
an N2 information class, or
a scope associated with the default notification subscription.

12. The method of claim 11, wherein said acquiring comprises:
acquiring the binding indication from an NF Repository Function, NRF, in an NF discovery process; or
acquiring the binding indication from the NF consumer in a service request that triggers the delivering of the notification to the default notification subscription.

13. The method of claim 11, wherein the notification request further indicates one or more of:
a notification type,
an N1 message class,
an N2 information class, or
a scope associated with the default notification subscription.

14. The method of claim 13, wherein at least one of the notification type, the N1 message class, the N2 information class, or the scope is carried in a header from which a query parameter for NF discovery is derivable.

15. The method of claim 11, wherein the binding indication indicates a binding level set to an NF service instance, an NF service set, an NF instance, or an NF set; and/or wherein the binding indication is carried in a 3gpp-sbi-binding header or a 3gpp-sbi-routing-binding header.

16. A method in a network node implementing a Service Communication Proxy, SCP, function, comprising:
receiving, from a Network Function, NF, producer, a notification request for delivering a notification to a default notification subscription for which a callback Uniform Resource Identifier, URI, is acquired to replace the URI as a target URI of the notification from the NF producer;
acquiring a binding indication associated with an NF consumer for the default notification subscription; and
reselecting another NF consumer for delivering the notification to the default notification subscription based on the binding indication,
wherein the binding indication comprises one or more of:
a notification type,
an N1 message class,
an N2 information class, or
a scope associated with the default notification subscription.

17. The method of claim 16, wherein said acquiring comprises:
acquiring the binding indication from an NF Repository Function, NRF, in an NF discovery process, or
extracting the binding indication from the notification request received from the NF producer.

18. The method of claim 16, wherein the notification request further indicates one or more of:
a notification type,
an N1 message class,
an N2 information class, or
a scope associated with the default notification subscription.

19. The method of claim 18, wherein at least one of the notification type, the N1 message class, the N2 information class, or the scope is carried in a header from which a query parameter for NF discovery is derivable.

20. The method of claim 16, wherein said reselecting is in response to a failure, load balancing, or load rebalancing associated with the NF consumer.

21. The method of claim 16, wherein the binding indication indicates a binding level set to an NF service instance, an NF service set, an NF instance, or an NF set; and/or wherein the binding indication is carried in a 3gpp-sbi-binding header or a 3gpp-sbi-routing-binding header.

* * * * *